US007286279B2

(12) United States Patent
Yu et al.

(10) Patent No.: US 7,286,279 B2
(45) Date of Patent: Oct. 23, 2007

(54) MICROENCAPSULATION PROCESSES AND COMPOSITIONS FOR ELECTROPHORETIC DISPLAYS

(75) Inventors: Wenxin Yu, San Ramon, CA (US);
 Jing-Den Chen, Milpitas, CA (US);
 Chih-Yuan Liao, Saratoga, CA (US);
 Haiyan Gu, Davis, CA (US); HongMei Zang, Sunnyvale, CA (US);
 Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 759 days.

(21) Appl. No.: 10/632,171

(22) Filed: Jul. 30, 2003

(65) Prior Publication Data

US 2004/0201567 A1 Oct. 14, 2004

Related U.S. Application Data

(60) Provisional application No. 60/418,078, filed on Oct. 10, 2002, provisional application No. 60/400,021, filed on Jul. 30, 2002.

(51) Int. Cl.
 *G02B 26/00* (2006.01)
(52) U.S. Cl. .................. 359/296; 359/290; 359/297
(58) Field of Classification Search ................ 359/290, 359/296, 297, 238, 240, 243; 345/107; 204/478, 204/485; 430/28, 29, 32
See application file for complete search history.

(56) References Cited

U.S. PATENT DOCUMENTS

| 3,281,426 | A | | 10/1966 | van Dyke Tiers |
| 4,218,302 | A | | 8/1980 | Dalisa et al. |
| 5,069,994 | A | | 12/1991 | Gitzel et al. |
| 5,244,768 | A | | 9/1993 | Inaba |
| 5,525,450 | A | * | 6/1996 | Spiewak et al. ............ 430/115 |
| 5,573,711 | A | | 11/1996 | Hou et al. |
| 5,930,026 | A | | 7/1999 | Jacobson et al. |
| 5,961,804 | A | | 10/1999 | Jacobson et al. |
| 6,392,786 | B1 | | 5/2002 | Albert |
| 7,177,066 | B2 | * | 2/2007 | Chung et al. ............... 359/296 |

FOREIGN PATENT DOCUMENTS

| EP | 0 594 126 | 4/1994 |
| WO | WO 02/01281 | 1/2002 |

OTHER PUBLICATIONS

U.S. Appl. No. 60/443,893, filed Jan. 2003, Liang et al., (corresponding to U.S. Appl. No. 10/766,757 and WO 04/068234).
U.S. Appl. No. 09/518,488, filed Mar. 2000, Liang et al., (corresponding to WO 01/67170).
U.S. Appl. No. 09/606,654, filed Jun. 2000, Liang et al., (corresponding to US 6,672,921 and WO 02/01281).
U.S. Appl. No. 09/784,972, filed Feb. 2001, Chan-Park et al., (corresponding to US 2002-0182544 and WO 02/65215).
U.S. Appl. No. 09/874,391, filed Jun. 2001, Zang et al., (corresponding to US 2002-0188053 and WO 02/098977).
U.S. Appl. No. 09/879,408, filed Jun. 2001, Chen et al., (corresponding to US 6,545,797 and US 2002-0196525 and WO 02/100155).
U.S. Appl. No. 10/198,729, filed Jul. 2002, Liang et al., (corresponding to US 6,885,495 and US 2004-0263946 and US 2003-0035198 and WO 03/009059).
U.S. Appl. No. 10/222,036, filed Aug. 2002, Liang et al., (corresponding to US 2003-0034950 and WO 03/016993).
U.S. Appl. No. 10/335,051, filed Dec. 2002, Chen et al., (corresponding to US 2003-0207963 and WO 03/057360).
U.S. Appl. No. 10/335,210, filed Dec. 2002, Chen et al., (corresponding to US 2003-0169227 and WO 03/058335).
U.S. Appl. No. 10/394,488, filed Mar. 2003, Ho et al., (corresponding to US 6,927,892 and US 2004-0136046 and WO 03/081325).
U.S. Appl. No. 10/421,217, filed Apr. 2003, Chung et al., (corresponding to US 6,914,713 and US 2003-0197916 and WO 03/091797).
Int'l Search Report Dec. 2003 PCT (PCT/US03/023891).
Chen, S.M. (Jul. 2003) The Applications for the Revolutionary Electronic Paper Technology. *OPTO News & Letters*, 102, 37-41. (In Chinese, English abstract attached, full translation available upon request).
Chen, S.M. (May 2003) The New Applications and the Dynamics of Companies. *TRI*. 1-10. (In Chinese, English abstract attached, full translation available upon request).
Hopper and Novotny (1979) An Electrophoretic Display, its Properties, Model, and Addressing, *IEEE Trans. Electr. Dev.*, ED 26 (8), pp1148-1152.
Lee, H., & Liang, R.C. (Jun. 2003) SiPix Microcup(R) Electronic Paper - An Introduction. *Advanced Display*, Issue 37, 4-9 (in Chinese, English abstract attached, full translation available upon request).
Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

(Continued)

*Primary Examiner*—Timothy J. Thompson
(74) *Attorney, Agent, or Firm*—Howrey LLP

(57) ABSTRACT

The present invention is directed to a method for improving the performance of an electrophoretic display, which method comprises adding a fluorinated quaternary nitrogen salt in either the internal phase or the continuous phase in a microencapsulation process for the formation of pigment-containing microparticles. One or more of the following materials may be further added to the internal phase or continuous phase in the microencapsulation process: a fluorinated protective colloid, a second charge controlling agent or a second monomer or oligomer.

62 Claims, No Drawings

OTHER PUBLICATIONS

Liang, R.C., Hou, J., Chung, J., Wang, X., Pereira, C., & Chen, Y. (2003). Microcup(R) Active and Passive Matrix Electrophoretic Displays by A Roll-to-Roll manufacturing Processes. *SID Digest*, 20.1.

Liang, R.C., Hou. J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays.* Paper presented at the SDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., & Tseng, S. (Feb. 2003). *Microcup(R) LCD, A New Type of Dispersed LCD by A Roll-to-Roll Manufacturing Process.* Paper presented at the IDMC, Taipei, Taiwan.

Mossman, M.A. et al, (2000) New Reflective Display Based on Total Internal Reflection in Prismatic Microstructure. *SID IDRC Proceeding,* pp. 311-314.

Mossman, M.A. et al, (2001) New Reflective Color Display Technique Based on Total Internal Reflection and Subtractive Color Filtering. *SID 2001 Sigest,* pp. 1054-1057.

Mossman, M.A. et al, (2002) Grey Scale Control of TIR using Electrophoresis of Sub-Optical Pigment Praticles. *SID 2002 Digest,* pp. 522-525.

Nikkei Microdevices. (Dec. 2002) Newly-Developed Color Electronic Paper Promises - Unbeatable Production Efficiency. *Nikkei Microdevices, 3.* (in Japanese, with English translation).

Zang, H.M., & Liang, R.C. (2003) Microcup Electronic Paper by Roll-to-Roll Manufacturing Processes. *The Spectrum,* 16(2), 16-21.

\* cited by examiner

MICROENCAPSULATION PROCESSES AND COMPOSITIONS FOR ELECTROPHORETIC DISPLAYS

CROSS-REFERENCE TO RELATED APPLICATIONS

This application claims the priority under 35 USC 119(e) of U.S. Provisional Applications No. 60/400,021, filed Jul. 30, 2002, and 60/418,078, filed Oct. 10, 2002. The whole content of each of these applications is incorporated into this application by reference.

BACKGROUND OF THE INVENTION

1. Field of the Invention

This invention relates to a method for improving the performance of an electrophoretic display and a microparticle forming process for the preparation of an electrophoretic dispersion. The dispersion may be used in all types of electrophoretic displays including transmissive, reflective and transflective displays. It may also be used in an electrophoretic display having the traditional up/down switching mode, the in-plane switching mode, or the dual switching mode, and in the total internal reflection (TIR) type of electrophoretic displays.

2. Description of Related Art

The electrophoretic display (EPD) is a non-emissive device based on the electrophoresis phenomenon influencing charged pigment particles suspended in a colored dielectric solvent. This type of display was first proposed in 1969. An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively, are needed to drive the displays. In contrast, an array of thin film transistors (TFTs) on the bottom plate and a common, non-patterned transparent conductor plate on the top viewing substrate are required for the active type EPDs. An electrophoretic dispersion composed of a colored dielectric solvent with charged pigment particles dispersed therein is enclosed between the two plates.

When a voltage difference is imposed between the two plates, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages.

EPDs of different pixel or cell structures have been reported previously, for example, the partition-type EPD (M. A. Hopper and V. Novotny, *IEEE Trans. Electr. Dev.*, 26(8):1148–1152 (1979)), the microencapsulated EPD (U.S. Pat. Nos. 5,961,804 and 5,930,026) and the total internal reflection (TIR) type of EPD using microprisms or microgrooves as disclosed in M. A. Mossman, et al, SID 01 Digest pp. 1054 (2001); SID IDRC proceedings, pp. 311 (2000); and SID'02 Digest, pp. 522 (2002).

An improved EPD technology was recently disclosed in U.S. application Ser. No. 09/518,488 (WO 01/67170), Ser. No. 09/606,654 (WO 02/01281), Ser. No. 09/784,972 (US Published Application No. 2002/0182544, WO 02/65215). The improved EPD comprises isolated cells formed from microcups of well-defined shape, size and aspect ratio and filled with charged pigment particles dispersed in a dielectric solvent, preferably a fluorinated solvent or solvent mixture. The filled cells are individually top-sealed with a polymeric sealing layer, preferably formed from a composition comprising a material selected from a group consisting of thermoplastics, thermosets and precursors thereof.

The microcup EPDs may have the traditional up/down switching mode, the in-plane switching mode or the dual switching mode. In the display having the traditional up/down switching mode or the dual switching mode, there are a top transparent electrode plate, a bottom electrode plate and a plurality of isolated cells enclosed between the two electrode plates. In the display having the in-plane switching mode, the cells are sandwiched between an insulator layer and an electrode plate.

For all types of the EPDs, the dispersion contained within the individual cells of the display is undoubtedly one of the most crucial parts of the device. The dispersion, as stated earlier, usually is composed of pigment particles dispersed in a dielectric solvent. The composition of the dispersion determines, to a large extent, the lifetime, contrast ratio, switching rate, response waveform and bistability of the device. In an ideal dispersion, the pigment particles remain separate and do not agglomerate or stick to the electrodes under all operating conditions. Furthermore, all components in the dispersion must be chemically stable and compatible not only with each other but also with the other materials present in an EPD, such as the electrodes and sealing materials.

The pigment particles in the dispersion may exhibit a native charge, or may acquire a charge when suspended in the dielectric solvent or may be charged using a charge controlling agent (CCA).

Halogenated solvents of high specific gravity have been widely used in EPD applications particularly in those involving an inorganic pigment, such as $TiO_2$, as the charged white or colored particles. The halogenated solvents of high specific gravity are very useful in reducing the rate of sedimentation of the pigment particles in the solvent. Fluorinated solvents are among the most preferred because they are chemically stable and environmentally friendly. However, most CCAs and dispersants suitable for use in hydrocarbon solvents are not effective for dispersions in fluorinated solvents, particularly high boiling-point perfluorinated solvents. This could be due to poor solubility or charge separation of the CCAs in these solvents. As a result, pigment particles are very difficult to disperse in perfluorinated solvents. Therefore, EPDs based on perfluorinated dielectric solvents typically show poor stability and switching performance.

To improve the stability and display performance of EPDs based on fluorinated solvents, an electrophoretic dispersion comprising 22.5 to 44.25% by weight of a hydrocarbon solvent, 54.42–75.20% by weight of at least one chlorine-free fluorinated solvent and 0.1 to 1.5% by weight of a fluorinated surfactant, was disclosed in U.S. Pat. No. 5,573,711. The presence of a hydrocarbon solvent such as phenylxylylethane, phenyloctane, decahydronaphthalene or xylene was claimed to result in a stronger solvent system that gives a better display performance. However, the use of a hydrocarbon solvent in any significant amount is undesirable because it lowers the specific gravity of the solvent and, as a result, increases the sedimentation rate of the pigment particles particularly when a pigment of high specific gravity, such as $TiO_2$, is used.

The whole content of each document referred to in this application is incorporated by reference into this application in its entirety.

SUMMARY OF THE INVENTION

The first aspect of the present invention is directed to the use of a fluorinated quaternary nitrogen salt in the preparation of electrophoretic microparticles, especially pigment containing microparticles, for improvement of yield and size distribution of the microparticles and switching performance of an electrophoretic display. In one embodiment of this aspect of the invention, the fluorinated quaternary nitrogen salts may comprise at least one reactive functional group for interfacial polymerization/crosslinking.

The second aspect of the present invention is directed to a novel microparticle forming process, which process comprises:

(a) preparing a solution comprising a polymer precursor such as a monomer, chain extender or oligomer ("precursor/internal phase" or phase "I");
(b) emulsifying the precursor/internal phase into a dielectric solvent, such as a fluorinated solvent or solvent mixture ("continuous phase" or phase "F"); and
(c) forming microparticles by hardening the emulsion, in which a fluorinated quaternary nitrogen salt is present in phase "I", phase "F", or both phases "I" and "F".

In one of the preferred embodiments, a pigment, in the form of particles, may be predispersed in the precursor/internal phase.

Hardening of the emulsion may be accomplished through polymerization/crosslinking of the monomer, chain extender or oligomer, including interfacial polymerization/crosslinking. The polymer precursor(s) may be partially polymerized/crosslinked in step (a) before the emulsification step (b).

A protective colloid or dispersant, a second charge controlling agent or a second monomer, chain extender or oligomer may be present in the process to facilitate the polymerization/crosslinking reaction. A fugitive solvent or other additives such as a crosslinking agent, initiator, catalyst, antioxidant or UV absorber may also be added to the process to improve the processability and final performance.

The third aspect of the invention is directed to an electrophoretic dispersion comprising electrophoretic microparticles, especially pigment-containing microparticles, dispersed in a dielectric solvent wherein said electrophoretic microparticles comprises a fluorinated quaternary nitrogen salt.

The fourth aspect of the invention is directed to an electrophoretic display comprising display cells which are filled with an electrophoretic dispersion of the present invention. The EPD may have the traditional up-down switching mode, the in-plane switching mode, the total internal reflection (TIR) mode or the dual switching mode.

The fifth aspect of the invention is directed to a method for improving the performance of an electrophoretic display, which method comprises adding a fluorinated quaternary nitrogen salt in the internal phase, the continuous phase or both phases in a process for the formation of electrophoretic microparticles. In this aspect of the invention, one or more of the following materials may be further added to the internal phase or continuous phase of the process: a protective colloid, a second charge controlling agent or a second monomer, chain extender or oligomer.

DETAILED DESCRIPTION OF THE INVENTION

Unless defined otherwise in this specification, all technical terms are used herein according to their conventional definitions as they are commonly used and understood by those of ordinary skill in the art. Tradenames are identified for materials used and their sources are also given.

The term "alkyl" refers to an optionally unsaturated linear hydrocarbon radical of 1 to 30 carbon atoms, or an optionally unsaturated (but not aromatically unsaturated) branched or cyclic hydrocarbon radical of 3 to 30 carbon atoms, preferably of no more than 12 carbon atoms. Exemplary alkyl groups are methyl, ethyl, cyclopropylmethyl, cyclohexyl, cyclohexylmethyl, octyl, n-decyl, ethenyl, 3-hexenyl, and the like.

The term "heteroalkyl" refers to an alkyl radical as defined above in which one or more carbon atoms are replaced by O, S or NR* (wherein R* is hydrogen or an alkyl of 1–12 carbon atoms).

The term "polyether" refers to a radical formed by the removal of one hydrogen atom from a polyether that is an oligomer, co-oligomer, polymer or co-polymer of one or more optionally substituted alkylene oxides. Preferably a polyether radical in the present application is an oligomer, co-oligomer, polymer or co-polymer of either propylene oxide, ethylene oxide or both.

The term "polyetheralkyl" refers to an alkyl radical, typically a $C_{1-3}$ alkyl radical substituted with a polyether radical as defined above.

The term "fluoropolyether" refers to a radical formed by the removal of one hydrogen or fluorine atom from a polyether that is an at least partially fluorinated oligomer, co-oligomer, polymer or co-copolymer of one or more optionally substituted alkylene oxides. Exemplary fluoropolyether radicals are discussed below.

The term "fluoropolyetheralkyl" refers to an alkyl radical, typically a $C_{1-3}$ alkyl radical substituted with a fluoropolyether radical as defined above. Exemplary fluoropolyetheralkyl radicals include radicals formed from Krytox® perfluorinated or highly fluorinated polyethers and their derivatives, as seen in the Examples (e.g. the radicals on the pyridine nitrogen in KFTC1 of Preparation 11 and KPTC1 of Preparation 12 are fluoropolyetheralkyl radicals).

The term "alkoxy" refers to the group —O—$R^a$ wherein $R^a$ is an alkyl as defined above. The term "heteroalkoxy" refers to the group —O—$R^a$ wherein $R^a$ is a heteroalkyl as defined above.

The term "aryl", as in "aryl", "arylalkyl" or "alkylaryl", refers to an organic radical derived from an aromatic hydrocarbon having 3 to 18 carbon atoms including, but not limited to, phenyl, naphthyl, anthracenyl and the like.

The term "heteroaryl" refers to an aryl radical as defined above in which one or more of the ring carbon atoms are replaced by O, S or NR* (R* is as defined above), such as pyridyl, thienyl, furanyl or pyrrolyl.

The term "alkylene", "heteroalkylene", "arylene" or "heteroarylene" refer to an alkyl, heteroalkyl, aryl or heteroaryl moiety respectively which may be substituted at both ends.

Unless indicated otherwise, each "alkyl", "heteroalkyl", "aryl", "heteroaryl", "alkylene", "heteroalkylene", "arylene" and "heteroarylene", in the context of the present invention, may be optionally substituted with one or more of the following: alkyl, heteroalkyl, aryl, heteroaryl, alkylaryl, heteroalkyl-aryl, alkyl-heteroaryl, heteroalkyl-heteroaryl, arylalkyl, heteroaryl-alkyl, aryl-heteroalkyl, heteroaryl-heteroalkyl, —NO$_2$, NC—, HO(O)C—, RO—, R$_2$N—, RS—, RCO—, RC(O)O—, RO(O)C—, RNHC(O)—, R$_2$NC(O)—, RNHC(O)O—, ROC(O)NH—, RC(O)NH—, RC(S)NH—, RNHC(O)NH—, RNHC(S)NH—, RSC(O)NH—, R=N—, RNHC(O)S—, and the like (wherein R is hydrogen, an alkyl, heteroalkyl, aryl, heteroaryl, alkylaryl, heteroalkyl-aryl, alkyl-heteroaryl, heteroalkyl-heteroaryl, arylalkyl, heteroaryl-alkyl, aryl-heteroalkyl or heteroaryl-heteroalkyl). Preferably, "alkyl", "heteroalkyl", "aryl", "heteroaryl", "alkylene", "heteroalkylene", "arylene" and "heteroarylene" are unsubstituted or substituted with an alkyl or aryl.

The term "halogenated" or "fluorinated" refers to a moiety in which some or all of the hydrogen atoms are replaced with halogen or fluorine atoms, respectively.

The term "fluorinated quaternary nitrogen salt" refers to a salt comprising a moiety having a quaternary nitrogen atom and a counterion and the salt comprises at least 10% by weight, preferably at least 25% by weight and more preferably at least 40% by weight of fluorine (either from the moiety having the quaternary nitrogen atom or from the counterion). Exemplary fluorinated quaternary nitrogen salts are discussed below.

The term "electrophoretic microparticles" is understood to broadly cover all charged particles including charged primary pigment particles and microparticles prepared from a microparticle forming process. The microparticles may or may not have a pigment contained therewithin.

Naming of complex substituents follows the rule that the secondary substituent on the moiety being substituted is named first and the primary substituent through which the secondary substituent is connected to the moiety being substituted is named second. Thus a "hydroxyethyl" radical is an ethyl radical substituted by a hydroxy radical, an "arylalkyl" radical is an alkyl radical (as defined) that is substituted by an aryl radical (as defined), etc.

The first aspect of the present invention is directed to the use of a fluorinated quaternary nitrogen salt in the preparation of electrophoretic microparticles for improvement of yield and size distribution of the microparticles and switching performance of an electrophoretic display.

Exemplary fluorinated quaternary nitrogen salts include pyridinium, quinolinium, ammonium, acridinium and azolium salts, fused ring or polynuclei derivatives or isomers thereof as represented by the structures shown below: P-1, P-2 and P-3 for pyridinium salts, Q-1, Q-2 and Q-3 for quinolinium salts, A-1, A-2, A-3, A-4 and A-5 for ammonium salts, A-6, A-7 and A-8 for acridinium salts, A-9, A-10 and A-11 for azolium salts and A-12 for a fused ring derivative.

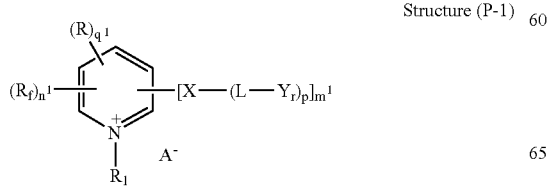

Structure (P-1)

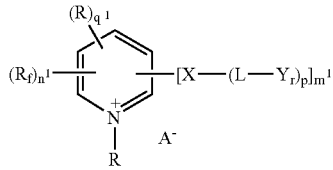

Structure (P-2)

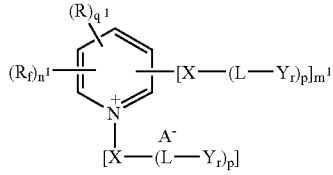

Structure (P-3)

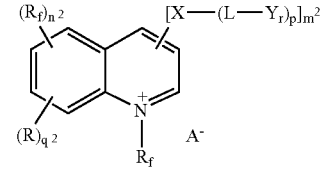

Structure (Q-1)

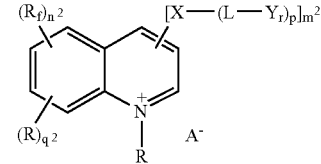

Structure (Q-2)

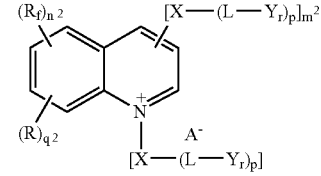

Structure (Q-3)

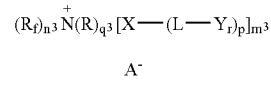

Structure (A-1)

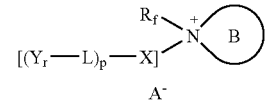

Structure (A-2)

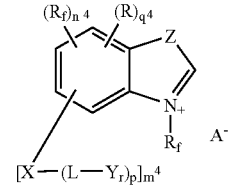

Structure (A-3)

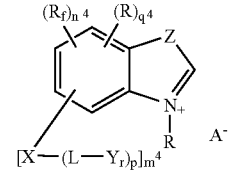

Structure (A-4)

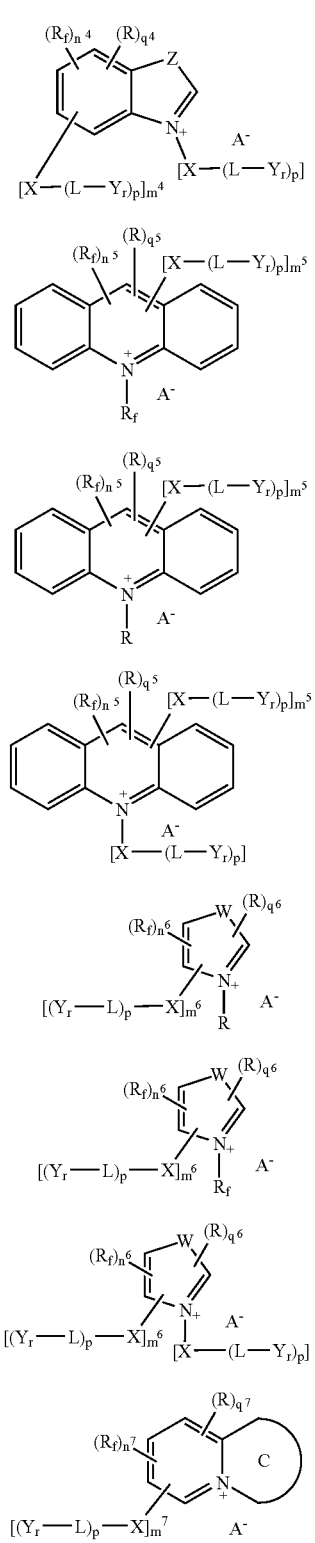

wherein:
A⁻ is a counterion,
R is chlorine, bromine, iodine, cyano, nitro or is alkyl, heteroalkyl, aryl or heteroaryl (each being optionally substituted); R¹O—, R¹S—, R¹R²N—, R¹CO—, R¹OCO—, R¹COO—, R¹CONR²—, R¹R²NCO—, R¹NHCONR²—, R¹SO₂NR²—, R¹R²NSO₂—, R¹SO—, R¹SO₂— in which R¹ and R² are independently hydrogen or are independently alkyl, heteroalkyl, aryl or heteroaryl (each being optionally substituted);

$R_f$ is fluorine, a fluorinated derivative of any one of alkyl, heteroalkyl, aryl or heteroaryl (each being optionally substituted) or a fluorinated oligomer or polymer of Formula (A) below;

provided that $R_f$ is not fluorine when $R_f$ is bonded to nitrogen;

W is —S— or is —NR³— in which R³ is hydrogen, alkyl, heteroalkyl, aryl or heteroaryl, (each being optionally substituted);

X is a linking group;

L is absent or a di-, tri- or tetra-valent linking chain;

Y is a reactive functional group;

Z is —O— or —S—, or is —CR⁴₂— or —NR⁴— in which each R⁴ is independently hydrogen, alkyl, heteroalkyl, aryl or heteroaryl, (each being optionally substituted);

r is 1–3;

p is 1–5;

$m^1$, $n^1$ and $q^1$ are independently integers from 0–5, and $m^1+n^1+q^1 \leq 5$;

$m^2$, $n^2$, and $q^2$ are independently integers from 0–7 and $m^2+n^2+q^2 \leq 7$;

$m^3$, $n^3$, and $q^3$ are independently integers from 0–4, and $m^3+n^3+q^3=4$;

$m^4$, $n^4$, and $q^4$ are independently integers from 0–5, and $m^4+n^4+q^4 \leq 5$;

$m^5$, $n^5$, and $q^5$ are independently integers from 0–9, and $m^5+n^5+q^5 \leq 9$;

$m^6$, $n^6$, and $q^6$ are independently integers from 0–3, and $m^6+n^6+q^6 \leq 3$;

$m^7$, $n^7$, and $q^7$ are independently integers from 0–6, and $m^7+n^7+q^7 \leq 6$;

the ring B is a saturated or unsaturated (but not aromatically unsaturated) monocyclic or fused bi- or tricyclic ring having 4–13 ring atoms, optionally comprising one or two ring heteroatoms selected from the group consisting of O, S and NR* (where R* is as defined earlier), such that structure A-2 is an optionally substituted pyrrolidinium, piperidinium, morpholinium salt or the like; and the ring C is an aromatic monocyclic or fused bi- or tricyclic ring having 4–12 ring atoms, optionally comprising 1–4 ring heteroatoms selected from the group consisting of O, S and NR* (where R* is as defined earlier), such that structure A-12 is an optionally substituted quinoliziny-lium salt or the like, provided that the fluorinated quaternary nitrogen salts comprise at least 10% by weight of fluorine.

Preferred counterions, in the context of the present invention include, but are not limited to, inorganic anions such as F⁻, Cl⁻, Br⁻, I⁻, $NO_3^-$, $NO_2^-$, $MnO_4^-$, $PF_6^-$, $AsF_6^-$ and $SbF_6^-$ or a borate ion (such as tetrafluoroborate or tetraphenyl borate wherein phenyl is optionally substituted with fluorine, an alkyl or fluoroalkyl), optionally fluorinated alkyl-, heteroalkyl-, aryl-, and heteroaryl-carboxylate and -sulfonate anions, $R_f$-substituted-carboxylate and -sulfonate anions (wherein $R_f$ is as defined above); and anions of optionally fluorinated di(alkylsulfonyl)imides.

The optionally fluorinated alkylcarboxylate anions may be expressed as, but are not limited to, $C_aH_bF_{(2a+1-b)}CO_2^-$ wherein a is 1–30, preferably 1–12 and b is determined based on the fluorine content. For example, b may be 0–61, preferably 0–25.

The optionally fluorinated alkylsulfonate anions may be expressed as, but are not limited to, $C_aH_bF_{(2a+1-b)}SO_3^-$ wherein a is 1–30, preferably 1–12 and b is determined based on the fluorine content. For example, b may be 0–61, preferably 0–25.

The optionally fluorinated arylcarboxylate and -sulfonate anions may be expressed as, but are not limited to, $C_aH_bF_{(2a-7-b)}CO_2^-$ and $C_aH_bF_{(2a-7-b)}SO_3^-$ wherein a is 6–30, preferably 6–12 and b is determined based on the fluorine content. Alternatively, the optionally fluorinated arylcarboxylate and -sulfonate anions may be expressed as, but are not limited to, $C_aH_bF_{(2a-13-b)}CO_2^-$ and $C_aH_bF_{(2a-13-b)}SO_3^-$ wherein a is 10–30, preferably 10–18 and b is determined based on the fluorine content.

The anions of optionally fluorinated di(alkylsulfonyl) imides may be expressed as, but are not limited to, $[C_aH_bF_{(2a+1-b)}SO_2]_2N^-$ wherein a is 1–30, preferably 1–12 and b is determined based on the fluorine content. For example, b may be 0–61, preferably 0–25.

Exemplary $R_f$ may be expressed as, but are not limited to, the following formula:

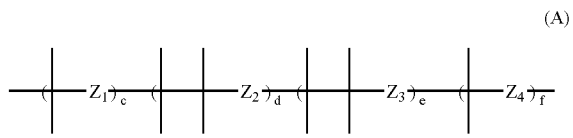

(A)

wherein:
the open positions (not designated) may be substituted independently by hydrogen, halogen (especially fluorine), alkyl, aryl, alkylaryl, arylalkyl, fluoroalkyl, fluoroaryl, fluoroalkylaryl, alkylfluoroaryl, fluoroarylalkyl, arylfluoroalkyl, $-OR^5$, $-OC(O)R^6$, $-C(O)OR^5$, $-C(O)NR^5R^6$ (wherein $R^5$ and $R^6$ are independently hydrogen, halogen (especially fluorine), alkyl, aryl, alkylaryl, arylalkyl, fluoroalkyl, fluoroaryl, fluoroalkylaryl, alkylfluoroaryl, fluoroarylalkyl, arylfluoroalkyl or a fluorinated polyether) and substituted derivatives thereof;
c, d, e and f may be independently 0–20, preferably 0–10; and
$Z_1$, $Z_2$, $Z_3$ and $Z_4$ are independently oxygen or absent.

Preferably, the open positions are independently substituted with fluorine or a fluorinated alkyl, especially a fluorinated methyl, so that the fluorinated oligomer or polymer of Formula A may be an oligomer, co-oligomer, polymer or co-polymer of difluoromethylene oxide, tetrafluoroethylene oxide, and hexafluoropropylene oxide, optionally also with terminal non-fluorinated alkylene oxides. These fluoropolyethers and their derivatives, e.g. fluoropolyethercarboxylates and fluoropolyethersulfonates, are widely available, as discussed elsewhere in this application. Preferred fluoropolyethercarboxylates and -sulfonates include $F(C_3F_6O)_dCF(CF_3)CO_2^-$, $F(C_3F_6O)_dCF_2CF_2CO_2^-$, $CF_3O(C_2F_4O)_dCF_2CO_2^-$, $F(C_2F_4O)_dCF_2CO_2^-$, $F(C_3F_6O)_dCF(CF_3)SO_3^-$, $F(C_3F_6O)_dCF_2CF_2SO_3^-$, $CF_3O(C_2F_4O)_dCF_2SO_3^-$ or $F(C_2F_4O)_dCF_2SO_3^-$ wherein d is 1–20, preferably 1–10. Preferred fluoropolyetheralkyl radicals include $F-(CF(CF_3)CF_2O)_d-CF(CF_3)CH_2O-(CH_2)_3-$, where d is 5–20, e.g., where d=7, as seen in Preparations 11 and 12.

Preferred linking groups X are alkylene, heteroalkylene, arylene, heteroarylene, oxyalkylene, oxyarylene, $-(OCHR^7CHR^8)_g-$, $-(CHR^7CHR^8O)_g-$, $-CO-$, $-C(O)O-$, $-OC(O)-$, $-C(O)NR^7-$, $-C(O)N<$, $-C(O)NH-$, $-NR^7-$, $-N=$, $-NR^7C(O)-$ in which $R^7$ and $R^8$ are independently hydrogen, alkyl, heteroalkyl, aryl or heteroaryl, (each being optionally substituted), especially hydrogen or $C_{1-3}$ alkyl, and g is 1–300, preferably 1–30; or a halogenated, particularly fluorinated, derivative thereof.

L, if not absent, is defined in the broadest sense. For example, it may be a linking chain comprising one or more of the following moieties, connected together but not in any particular order: alkylene, heteroalkylene, arylene, heteroarylene, polyether, fluoropolyether or a linking moiety. In one embodiment, L may comprise one or more of the following moieties, connected together but not in any particular order: alkylene, heteroalkylene, arylene, heteroarylene, polyether, fluoropolyether, $-O-$, $-HN-$, $>N-$, $-S-$, $-CO-$, $-C(O)O-$, $-O(O)C-$, $-NHC(O)-$, $>NC(O)-$, $-NHC(O)O-$, $-OC(O)NH-$, $-C(O)NH-$, $-C(S)NH-$, $-NHC(O)NH-$, $-NHC(S)NH-$, $-SC(O)NH-$, $-NHC(O)S-$, and the like.

It is understood that in the linking chain, L, there may be one or more of the same moieties. For example, the linking chain may comprise more than one alkylene moieties and in this case, the alkylene moieties may be the same or different.

Preferred reactive functional groups Y are $HO-$, $HS-$, $H_2N-$, $NCO-$, $NCS-$, $HO(O)C-$, epoxy, aziridinyl, carbodiimide, a short chain alkoxysilyl such as trimethoxy silyl, carboxylic acid derivatives such as acid anhydrides and acid halides, chloroformates, vinyls such as $-CH=CH_2$, $-OCH=CH_2$, $-OCOCH=CH_2$, $-OCOC(CH_3)=CH_2$, $-OOCCH=CHCOOH$, $-(C_6H_4)-CH=CH_2$, and other functional groups capable of undergoing polymerization or crosslinking. In one embodiment, Y is $HO-$, $H_2N-$, $NCO-$ or a vinyl.

Among the fluorinated quaternary nitrogen salts, the pyridinium (P-1, P-2, P-3), quinolinium (Q-1, Q-2, Q-3) and ammonium (A-1, A-2) salts are particularly effective in improving size distribution and switching performance of the pigment-containing microparticles.

In one embodiment, the fluorinated quaternary nitrogen salts is preferably represented by P-1 and A-1.

In another embodiment, $A^-$ is preferably optionally fluorinated alkyl- or aryl-carboxylate and -sulfonate anions or $R_f$-substituted-carboxylate and -sulfonate anions.

In another embodiment, $m^1-m^7$ is preferably 1 and p and r are independently 1 or 2.

In another embodiment, R is preferably an alkyl.

In another embodiment, $R_f$ is preferably a fluorinated alkyl or a fluorinated oligomer or polymer of Formula (A).

In another embodiment, X is an alkylene chain and L is absent. In this embodiment, Y is preferably $HO-$ or $H_2N-$.

In another embodiment, X is $-C(O)N<$ or $-C(O)NH-$ and L is an alkylene chain. In this embodiment, Y is preferably $HO-$ or $H_2N-$.

In another embodiment, X is an alkylene chain, L is a linking chain comprising one or more of the following, connected together, but not in any particular order: alkylene(s), $>N-$, $-O-$, $-OC(O)NH-$, $-NHC(O)-$, $-(O)CNH-$, $-NHC(O)N H-$, polyether or fluoropolyether and Y is $HO-$, $H_2N-$ or $-OCOC(CH_3)=CH_2$.

In another embodiment, X is $-C(O)N<$ or $-C(O)NH-$, L is a linking chain comprising one or more of the following, connected together but not in any particular order: alkylene(s), $>N-$, $-O-$, $-OC(O)NH-$, $-NHC(O)-$, $-(O)CNH-$, $-NHC(O)NH-$, polyether or fluoropolyether and Y is $HO-$, $H_2N-$ or $-OCOC(CH_3)=CH_2$.

In addition, it is understood that fluorinated quaternary nitrogen (FQN) salts which may be expressed by the formula of $(FQN^+)_kA^{-k}$ are also within the scope of the present invention. The integer k may be 2 or 3. In this case, the counterion may be divalent or trivalent (such as $CO_3^=$, $SO_3^=$, $SO_4^=$, $PO_3^\equiv$, $PO_4^{3-}$, $Cr_2O_7^=$ or $CrO_3^=$) or the counterion may comprise 2 or 3 monovalent anions and the monovalent anions may be the same or different.

Furthermore, the fluorinated quaternary nitrogen salts of the present invention may also be present in the form of a polymer synthesized from addition condensation or ring-opening polymerization. The fluorinated quaternary nitrogen salt may be on the main chain or on the side chain of the polymer structure. It is understood that such polymers are also within the scope of the present invention.

A suitable concentration of the fluorinated quaternary nitrogen salt used in the present invention is about 0.1 to about 20% by weight, preferably from about 0.2 to about 10% by weight, based on the total weight of the electrophoretic microparticles.

The fluorinated quaternary nitrogen salts or derivatives thereof may be synthesized by methods well known in the art. Specific examples are given below.

The second aspect of the present invention is directed to a process for the preparation of electrophoretic microparticles, which process comprises:

(a) preparing a solution comprising a polymer precursor such as a monomer, chain extender or oligomer ("precursor/internal phase" or phase "I");

(b) emulsifying the precursor/internal phase into a fluorinated solvent or solvent mixture ("continuous phase" or phase "F"); and (c) forming microparticles by hardening the emulsion, in which a fluorinated quaternary nitrogen salt is present in phase "I", phase "F", or both phases "I" and "F".

The hardening of the emulsion may be accomplished by polymerization/crosslinking of the monomer, chain extender or oligomer, including interfacial and/or in-situ polymerization/crosslinking. The polymer precursor(s) may be partially polymerized/crosslinked in step (a) before the emulsification step (b).

In one of the preferred embodiments, a pigment, in the form of particles, is predispersed in the precursor/internal phase. The pigment may be organic or inorganic pigments, such as $TiO_2$, $BaSO_4$, $CaCO_3$, ZnO, $Al_2O_3$, $Fe_2O_3$, $\gamma$-$Fe_2O_3$, phthalocyanine blue, phthalocyanine green, diarylide yellow, diarylide AAOT yellow, and quinacridone, azo, rhodamine or perylene pigment series from Sun Chemical, Hansa yellow G particles from Kanto Chemical or Carbon Lampblack from Fisher. Dyes or other colorants may also be included in the precursor/internal phase. A dispersant or surfactant may be used to facilitate the preparation of the pigment particle pre-dispersion by a conventional dispersing or milling mechanism such as homogenizer, sonicator, colloidal mill, high shear mixer, microfluidizer or the like. Particle size of the pigment in the pre-dispersion may be in the range of about 0.01 to about 2 microns, preferably in the range of about 0.2 to about 0.5 microns and more preferably in the range of about 0.25 to about 0.4 microns.

Suitable monomers, chain extenders or oligomers for interfacial and in-situ polymerization/crosslinking may include multifunctional isocyanates, thioisocyanates, epoxides, acid chlorides, chloroformates, alkoxysilanes, anhydrides, alcohols, thiols, amines and precondensates thereof. Preferred monomers, chain extenders or oligomers may be multifunctional amines (primary and secondary), thiols, alcohols, isocyanates, thioisocyanates, anhydrides, epoxides or precondensates thereof such as polyester polyols, polycaprolactone diol, polyether polyols, polyurethane polyols or isocyanate-encapped or epoxide-encapped derivatives thereof. The monomer, chain extender or oligomer is present in the amount of from 5 to 300% by weight, more preferably from 50 to 150% by weight and most preferably from 80 to 120% by weight, based on the total solid of the electrophoretic microparticles.

Suitable fluorinated solvents for step (b) generally have low vapor pressure, low viscosity and a dielectric constant in the range of about 1.7 to about 30, more preferably about 1.7 to about 5. Examples of suitable fluorinated solvents may include, but are not limited to, perfluorinated solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Solvay Solexis and perfluoropolyethers HT series and hydrofluoropolyethers (ZT series) from Solvay Solexis, FC-43 (heptacosafluorotributylamine), FC-70 (perfluorotri-n-pentylamine), PF-5060 or PF-5060DL (pefluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly(chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as HT-170, HT-200, HT-230, ZT-180 (Solvay Solexis) and trifluoro(trifluoromethyl)-oxirane homopolymers such as K6 and K-7 fluids (Dupont) are particularly useful.

To facilitate the emulsification process, a fugitive solvent or diluent may be used to reduce the viscosity of the precursor/internal phase and it is removed later by heat and/or vacuum during or after the emulsification step. To facilitate the stripping process, the boiling point of the fugitive diluent is preferably lower than 160° C., more preferably lower than 120° C. Examples of suitable fugitive solvents may include acetone, ether, methyl ethyl ketone (MEK), methyl propyl ketone, methyl butyl ketone, cyclohexanone, ethyl acetate, propyl acetate, methylene chloride, tetrahydrofuran, toluene, xylene and the like.

In the preparation of phase "F", a protective colloid or dispersant may be optionally added to improve the dispersion stability and control the particle size and particle size distribution of the microparticles. A reactive protective colloid or dispersant is particularly useful to improve the dispersion stability and electrophoretic performance. This is further illustrated below.

The emulsification step, step (b) of the process, may be either a direct or inverse emulsification process. In the case of direct emulsification, the precursor/internal phase may be directly emulsified into phase "F". In the case of inverse emulsification, the phase "F" is gradually added and emulsified into the phase "I" to first form an F-in-I (or F/I) emulsion. As the volume fraction of phase "F" increases, the emulsion undergoes a phase inversion, i.e., phase "F" becomes the continuous phase and the phase "I" becomes the dispersed phase to form an I-in-F (or I/F) emulsion. The phase inversion point may vary depending on the addition rate of phase "F", shear rate of mixing, chemical composition of the two phases, properties such as interfacial tension and viscosity of the two phases.

After the phase inversion is completed, more protective colloid or dispersant may be added to achieve a better colloidal stability and a more complete interfacial reaction at the particle surface. The resultant microparticles may be further post cured by in-situ polymerization/crosslinking of the unreacted monomers, chain extenders or oligomers encapsulated within the microparticles.

The total concentration of a protective colloid or dispersant used may range from about 0.1 to about 30% by weight, preferably from about 1 to about 20% by weight, more preferably from about 2% to about 15% by weight, based on the precursor/internal phase (phase "I"). The concentration of the protective colloid may be adjusted independently for optimal efficiency of the process.

The preferred protective colloids or dispersants are disclosed in U.S. application Ser. No. 10/335,051 (WO 03/057360).

The protective colloid or dispersant preferably comprises a reactive functional group capable of reacting with the monomers, chain extenders or oligomers from the precursor/internal phase to form a crosslinked shell. Examples of suitable protective colloids include amino- or hydroxy-functionalized fluorinated, particularly perfluorinated polymers or oligomers derived from perfluorinated hydrocarbons or perfluoropolyethers (from Du Pont and Solvay Solexis). The fluoropolyether amines such as those exemplified in Preparation 1 of the present application are particularly useful. Suitable fluoropolyether amines have molecular weights ranging from 300 to 50,000, preferably from 500 to 15,000. They may be prepared under mild conditions by reacting a fluoropolyether substituted with at least one ester group with a multifunctional amine.

Optionally, a second charge controlling agent (CCA) such as those acid-base or donor-acceptor type of CCAs as disclosed in U.S. application Ser. No. 10/335,210 (WO 03/058335), may also be added in the process for further improvement of the EPD switching performance, colloidal stability and particle size control of the electrophoretic microparticles. The CCA system comprises (i) a soluble fluorinated electron accepting or proton donating compound or polymer in the continuous phase and an electron donating or proton accepting compound or polymer in the precursor/internal phase, preferably on the surface of the particles; or (ii) a soluble fluorinated electron donating or proton accepting compound or polymer in the continuous phase and an electron accepting or proton donating compound or polymer in the precursor/internal phase, preferably on the surface of the particles. A reactive CCA is particularly preferred.

The second CCA may be soluble in phase "I" and added into step (a). The CCA may also be soluble or dispersible in phase "F" and added in the emulsification step (b). Optionally they may also be added in step (c) of the process. In one of the preferred embodiments of the present invention, a reactive CCA comprising a reactive functional group for interfacial polymerization/crosslinking is used. After having reacted with the monomers, chain extenders or oligomers at the particle interface, the reactive CCA not only improves the switching rate, but also functions as a covalently-bonded stabilizer of the microparticles and improves the colloidal stability and longevity of the EPD prepared therefrom.

Suitable reactive CCAs have reactive functional groups such as unsaturated double bonds including, but not limited to, vinyls, dienes, acrylates or methacrylates, primary or secondary amines, anilines, ureas, thioureas, alcohols, thiols, isocyanates, thioisocyanates, imines, epoxides, acid anhydrides, acid chlorides, chloroformates and the like.

Optionally a fluorinated organometallic compounds may be used as a CCA and added in step (b) of the process for improvement of the EPD switching performance, colloidal stability and particle size control of the microparticles. Preferred fluorinated metal organic compounds may include, but are not limited to, fluorinated metal naphthalocyanine or phthalocyanine dyes (such as CuPc-$R_f$ wherein $R_f$ may be $C_nH_xF_{2n+1-x}$, wherein n=1–18, preferably 4–12 and x is adjusted so that the fluorine content is no less than 10% by weight, preferably no less than 40% by weight), fluorinated quinolinol metal complexes and metal perfluoroacetoacetonates. The preferred metals may include Cu, Co, Ni, Ti, Fe, Mg, Zn, Zr and Al, with Cu being the most preferred. Fluorinated metal phthalocyanine and naphthalocyanine dyes may be prepared by the procedures as disclosed in U.S. Pat. No. 3,281,426.

The fluorinated Cu phthalocyanine dye used in phase "F" may be present in the amount of from about 0.1 to about 10% by weight, preferably from about 0.5 to about 5% by weight, based on the electrophoretic microparticles.

A second monomer, chain extender or oligomer may also optionally be added to further harden the microparticles by, for example, in-situ radical and/or condensation polymerization during or after the interfacial polymerization/crosslinking step. Suitable second monomers, chain extenders or oilgomers for the in-situ polymerization/crosslinking reaction in the precursor/internal phase may include monomers for radical or ionic polymerization such as vinyls, acrylates, methacrylates, styrenes, allyls, vinylethers and multifunctional derivatives thereof and monomers for condensation polymerization such as polyols, polythiols, anhydrides, polyamines, isocyanates, thioisocyanates or epoxides. The in-situ polymerization/crosslinking may be carried out at, for example, 50° C.–80° C. and stirred under low shear to post-cure the microparticles, after which the microparticle dispersion may be used directly as an EPD dispersion without further chemical purification. To further improve the degree of density matching between the microparticles and the fluorinated solvent or solvent mixture in which the microparticles are suspended, the microparticles may optionally be classified by centrifuge to remove the poorly density-matched particles.

The size of the electrophoretic particles, particularly the pigment-containing microparticles of the present invention, typically ranges from about 0.1 to about 10 microns, preferably from about 0.3 to about 3 microns.

In addition to the electrophoretic microparticles, a contrasting colorant may be used in the electrophoretic dispersion of the present invention. The contrast colorant may be formed from dyes or pigments. Nonionic azo and anthraquinone dyes are particularly useful. Examples of useful dyes may include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, and anthraquinone blue, anthraquinone yellow 114, anthraquinone reds 111 and 135 and anthraquinone green 28 from Aldrich. Perfluorinated dyes are particularly useful in this case where a fluorinated or perfluorinated dielectric solvent is used. If the contrasting colorant is insoluble in the dielectric solvent, a non-charged dispersion of the colorant is preferred. Particle size is preferably in the range of from about 0.01 to about 5 microns, more preferably in the range of from about 0.05 to about 2 microns. If the contrasting colorant particles are charged, they preferably carry a charge which is opposite from that of the electrophoretic microparticles. If both types of particles carry the same charge, then they should have different charge density or different electrophoretic mobility. In any case, the dye or pigment used in the electrophoretic dispersion must be chemically stable and compatible with other components in the dispersion. The dye or pigment for producing the contrast colorant may be predispersed in the dielectric solvent and added into the electrophoretic dispersion containing the electrophoretic microparticles. For a black/white EPD, the dispersion comprises charged white particles of titanium dioxide ($TiO_2$) dispersed in a blackened fluorinated dielectric solvent. A black dye or dye mixture such as Pylam Spirit Black and Fast Spirit Black from Pylam Products Co., Arizona, Sudan Black B from Aldrich, Thermoplastic Black X-70 from BASF or a black pigment such as carbon black may be used to generate the black color of the solvent. Modification of the dyes or pigments by introducing fluorinated or perfluorinated side chains such as $C_nF_{2n+1}$ (n=4–12) is useful to increase their solubility or dispersibility in highly fluorinated solvents. For a subtractive color system, the charged $TiO_2$ particles may be suspended in a fluorinated solvent of a cyan, yellow or magenta color. The cyan, yellow or magenta color may be generated via the use of a dye or a pigment. For an additive color system, the charged $TiO_2$ particles may be suspended in a fluorinated solvent of a red, green or blue color generated also via the use of a dye or a pigment. For most applications, the additive color system is preferred.

The third aspect of the invention is directed to an electrophoretic dispersion comprising electrophoretic microparticles dispersed in a dielectric solvent wherein said electrophoretic microparticles comprises a fluorinated quaternary nitrogen salt.

The fourth aspect of the invention is directed to an electrophoretic display comprising display cells which are filled with an electrophoretic dispersion of the present invention. The electrophoretic display may comprise:

(a) a top layer and a bottom layer, at least one of which is transparent,
(b) an array of display cells sandwiched between the two layers and the cells are filled with an electrophoretic dispersion comprising electrophoretic microparticles prepared from the second aspect of the present invention.

The electrophoretic microparticles may or may not have a pigment contained therein. The display may be any types of electrophoretic display known in the art, including the conventional types of electrophoretic displays.

The display may also be prepared from the microcup technology involving microembossing or photolithography as disclosed in U.S. application Ser. No. 09/518,488 (WO 01/67170), Ser. No. 09/606,654 (WO 02/01281), Ser. No. 09/879,408 (US Published Application No. 2002/0196525), Ser. No. 09/874,391 (US 2002/0188503), Ser. No. 10/198,729 (US 2003/0035198), Ser. No. 10/222,036 (US 2003/0034950); Ser. Nos. 10/394,488, and 10/421,217. In this case, the display cells are of well-defined size, shape and aspect ratio and are individually sealed, preferably with a polymeric sealing layer.

The display cells may be prepared by an encapsulation technology as described in U.S. Pat. Nos. 5,961,804 and 5,930,026 and in U.S. Application No. 60/443,893. In this microcapsule type of the displays, the size of the display cells ranges from about 5 to about 500 microns, preferably from about 25 to about 250 microns. The shell of the microcapsule cells is formed from interfacial polymerization/crosslinking of monomers, chain extenders or oligomers. The internal phase in the interfacial encapsulation process may comprise the electrophoretic microparticles of the present invention dispersed in a dielectric solvent, particularly a fluorinated solvent.

When the display dispersion comprises the electrophoretic microparticles of the present invention without a pigment contained therein, the display may be based on total internal reflection as disclosed in M. A. Mossman, et al, SID 01 Digest pp. 1054 (2001); SID IDRC proceedings, pp. 311 (2000) and SID'02 Digest, pp. 522 (2002). In the display with the TIR switching mode, the reflection of light is modulated by moving the microparticles into optical contact with the prismatic reflector surface.

The display may also have the traditional up/down switching mode, the in-plane switching mode or the dual switching mode.

If the displays are driven by the traditional up/down switching mode or the dual switching mode, both the top and bottom layers are electrode plates, and at least one of which is transparent and the cells are enclosed between the two electrode plates. The up/down mode allows the charged pigment-containing microparticles to move in the vertical (up/down) direction whereas the dual switching mode allows the pigment-containing microparticles to move in both the vertical (up/down) direction and the planar (left/right) direction. In the display having the in-plane switching mode, the cells are sandwiched between an insulator layer and an electrode plate. The in-plane switching mode allows the pigment-containing microparticles to move in the planar direction only.

The fifth aspect of the invention is directed to a method for improving the performance of an electrophoretic display, which method comprises adding a fluorinated quaternary nitrogen salt in either the precursor/internal phase or the continuous phase of a process for the formation of electrophoretic microparticles, especially the pigment-containing microparticles. In this aspect of the invention, one or more of the following materials may be further added to the precursor/internal phase or continuous phase in the process: a protective colloid, a second charge controlling agent or a second monomer, chain extender or oligomer. The details of the method have been described above.

EXAMPLES

The following examples are given to enable those skilled in the art to more clearly understand, and to practice, the present invention. They should not be considered as limiting the scope of the invention, but merely as being illustrative and representative thereof.

Synthesis of a Reactive Protective Colloid $R_f$-amine

Preparation 1

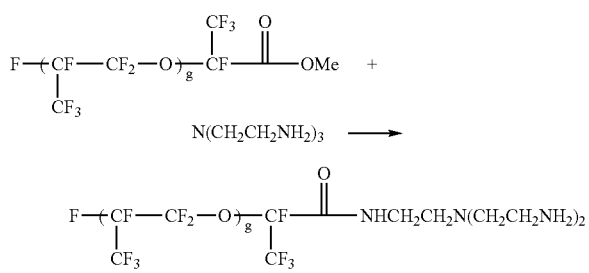

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4–6 hours. The crude product was then dissolved in 50 ml of PFS2 solvent (perfluoropolyether from Solvay Solexis) and extracted with 20 ml of ethyl acetate three times, then dried to yield 17 gm of purified product ($R_f$-amine1900) which showed excellent solubility in HT200.

Other reactive $R_f$ amines having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure using Krytox® methyl esters of the appropriate molecular weights. $R_f$-amine350 was also prepared by the same procedure, except that the Krytox® methyl ester was replaced by $CF_3CF_2CF_2COOCH_3$ (SynQuest Labs, Alachua, Fla.).

Preparation of Fluorinated Pyridinium Salts (Preparations 2–14)

Preparation 2

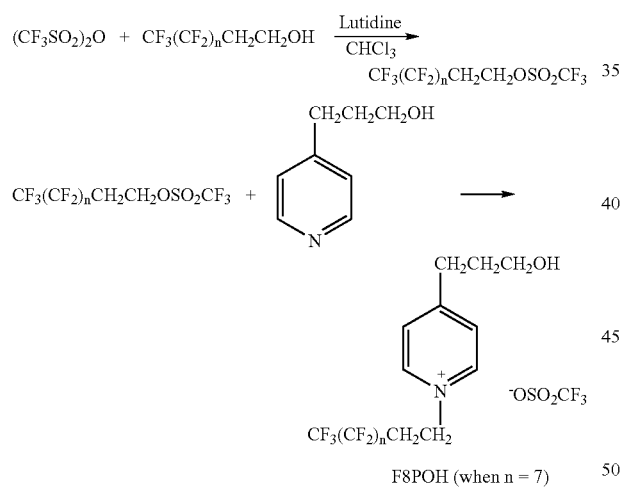

3.21 Gm (30.0 mmol) of 2,6-lutidine (Aldrich) and 11.6 gm (25.0 mmol) of 1H,1H,2H,2H-perfluorodecanol [$CF_3(CF_2)_nCH_2CH_2OH$, n=7] were dissolved in 150 ml of chloroform in a flask and cooled in a 0° C. bath. To the solution, 8.5 gm (30.0 mmol) of trifluoromethanesulfonic anhydride pre-dissolved in 100 ml of chloroform was added dropwise with stirring over a period of 30 minutes. The mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Gm (yield: 83.6%) of a white crystal (1H,1H,2H,2H-perfluorodecyl triflate, $CF_3(CF_2)_nCH_2CH_2OSO_2CF_3$, n=7) was obtained.

5.96 Gm (10 mmol) of the thus obtained 1H,1H,2H,2H-perfluorodecyl triflate was added into a solution containing 30 ml of methylene chloride and 1.37 gm (10 mmol) of 4-pyridinepropanol (Aldrich). The reaction mixture was stirred for 6 hours to allow the reaction to complete. After settling, the lower layer was separated and dried. 5.59 Gm of a light yellow solid, 1-(1H,1H,2H,2H-perfluorodecyl)-4-(3-hydroxypropyl)-pyridinium triflate (hereinafter referred to as F8POH) was obtained.

Other fluorinated pyridinium salts with different side chain lengths, e.g., n=6, n=9, n=11 and a mixture of n=5, 6, 7, 8, etc. were also synthesized according to the same procedure.

Preparation 3

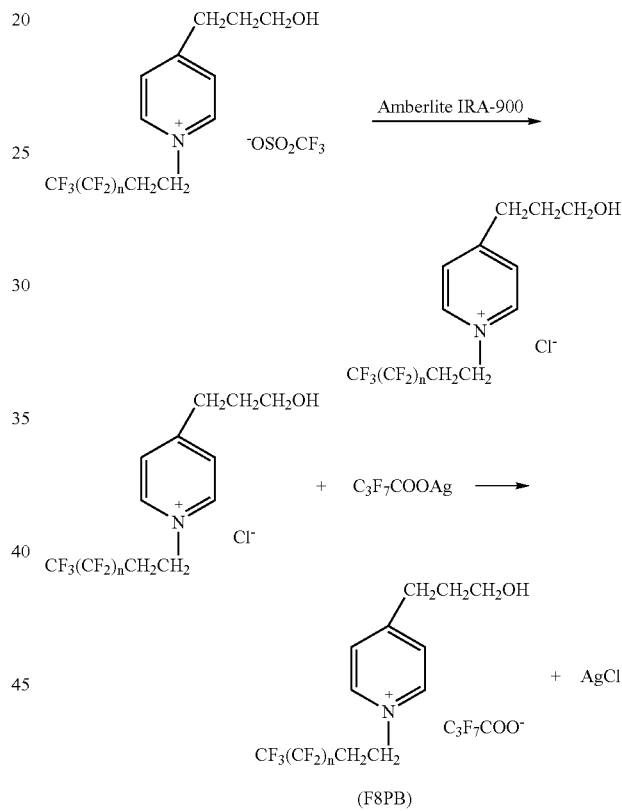

10 Gm of F8POH (prepared from Preparation 2) was dissolved in 80 ml of MeOH and the solution was passed through a short column containing 15 gm of Amberlite® IRA-900 resin (Aldrich). Another 50 ml of MeOH was used to wash the column. After the solvent was stripped off under vacuum, 8 gm of a waxy solid was obtained.

6 Gm of the obtained chloride salt was dissolved in 10 ml of MeOH and 90 ml of $CH_3CN$, and stirred at room temperature. To this solution was added 3.1 gm of silver heptafluorobutyrate pre-dissolved in 10 ml of MeOH. A white precipitate was formed immediately. The solution was stirred continuously for one hour and then filtered to remove the AgCl precipitate. After evaporation of the solvent, 7.1 gm of a solid was obtained. The purity of the compound (n=7) was confirmed by $^{19}F$ NMR.

Preparation 4

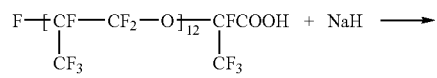

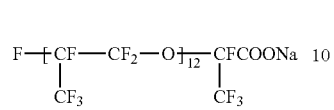

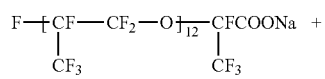

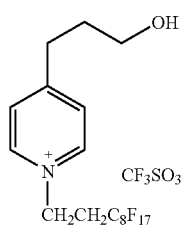

(F8C1)

To a solution of 50 gm of Krytox® FSL (Du Pont, MW 2200) in 220 ml of ethyl perfluorobutyl ether (3M) and 30 ml of anhydrous diethyl ether was added 0.72 gm of sodium hydride. The mixture was stirred for 12 hours at room temperature to allow the reaction to complete. The reaction mixture was passed through a 10 cm-column of Celite® (Fisher) and then filtered through a 0.45 μm Nylon membrane to remove the excess sodium hydride. The solvent was stripped off under vacuum to yield 50 gm of a viscous product (sodium PFPO carboxylate wherein PFPO stands for perfluoropolypropylene oxide). The purity was confirmed by $^{19}$FNMR.

10 Gm of the obtained sodium PFPO carboxylate salt and 3.33 gm of F8POH (prepared from Preparation 2) were dissolved in 40 ml and 10 ml of methanol respectively. These two solutions were mixed together and phase separation formed immediately. 30 Ml of PFS2 (Solvay Solexis) was used to extract the product twice. The PFS2 layers were then combined and washed with 20 ml of methanol twice. 20 Gm of the product (1-(1H,1H,2H,2H-perfluorodecyl)-4-(3-hydroxypropyl)-pyridinium PFPO carboxylate, F8C1) was obtained after the solvent was stripped off. The purity of the product was confirmed by IR.

Preparation 5

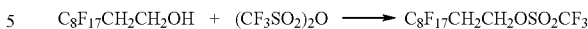

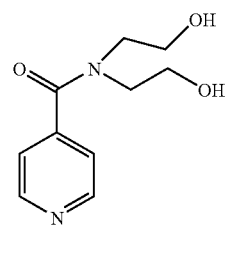

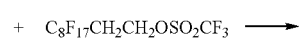

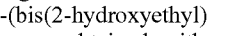

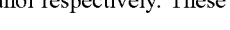

FNC1

22.4 Gm (37.5 mmol) of 1H,1H,2H,2H-perfluorodecyl triflate was dissolved in 30 ml of Freon 113 and 300 ml of acetonitrile. 7.8 Gm (37.5 mmol) of N,N-Bis(2-hydroxyethyl)isonicotinamide was added. The mixture was heated to 50° C. and continuously stirred for 5 hours. The solvent was stripped off under vacuum and 28 gm of a white solid (1-(1H,1H,2H,2H-perfluorodecyl)-4-(bis(2-hydroxyethyl)aminocarbonyl)-pyridinium triflate) was obtained with a yield of 93%. The purity was confirmed by $^1$H NMR and $^{19}$F NMR.

16.0 Gm of sodium PFPO carboxylate salt and 5.1 gm of the obtained 1-(1H,1H,2H,2H-perfluorodecyl)-4-(bis(2-hydroxyethyl)aminocarbonyl)-pyridinium triflate were dissolved in 40 ml and 10 ml of methanol respectively. These two solutions were mixed together and phase separation formed immediately. 30 Ml of PFS2 (Solvay Solexis) was used to extract the product twice. The PFS2 layers were combined and washed with 20 ml of methanol twice. 20 Gm of the product, 1-(1H,1H,2H,2H-perfluorodecyl)-4-(bis(2-hydroxyethyl)aminocarbonyl)-pyridinium PFPO carboxylate, FNC1, was obtained after the solvent was stripped off. The purity of the product was confirmed by $^{19}$F NMR.

Preparation 6

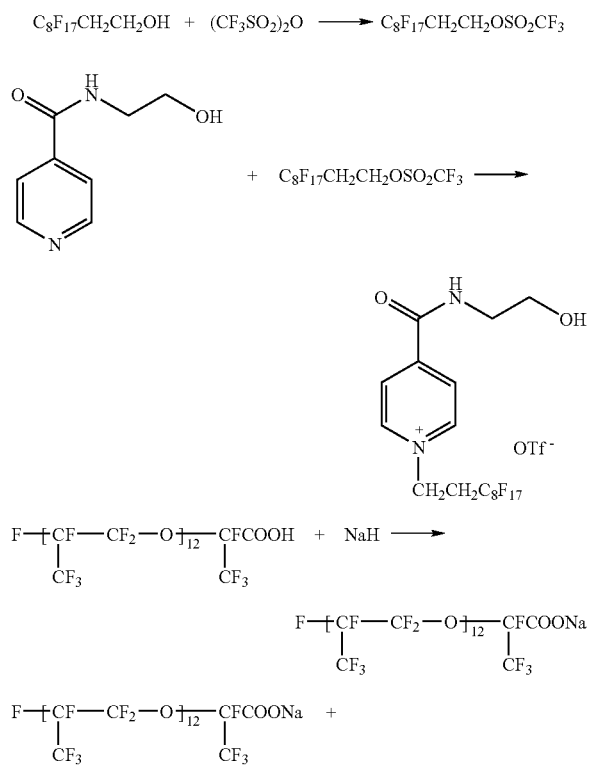

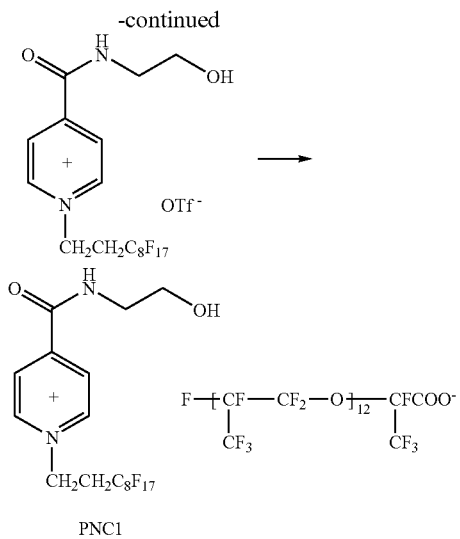

PNC1

18 Gm (30 mmol) of 1H,1H,2H,2H-perfluorodecyl triflate was dissolved in 50 ml of Freon 113 and 100 ml of acetonitrile. 5 Gm (30 mmol) of N-(2-hydroxyethyl)isonicotinamide was added. The mixture was heated to 50° C. and continuously stirred for 12 hours. The solvent was stripped off under vacuum and 20 gm of a white waxy solid, 1-(1H,1H,2H,2H-perfluorodecyl)-4-((2-hydroxyethyl)aminocarbonyl)-pyridinium triflate, was obtained. The purity was confirmed by $^1$H NMR and $^{19}$F NMR.

16.4 Gm of the obtained sodium PFPO carboxylate salt and 5 gm of 1-(1H,1H,2H,2H-perfluorodecyl)-4-((2-hydroxyethyl)aminocarbonyl)-pyridinium triflate were dissolved in 40 ml and 10 ml of methanol respectively. These two solutions were mixed together and phase separation formed immediately. 30 Ml of PFS2 (Solvay Solexis) was used to extract the product twice. The PFS2 layers were then combined and washed with 20 ml of methanol twice. 20 Gm of the product, 1-(1H,1H,2H,2H-perfluorodecyl)-4-((2-hydroxyethyl)aminocarbonyl)-pyridinium PFPO carboxylate, PNC1, was obtained after the solvent was stripped off. The purity of the product was confirmed by IR.

Preparation 7

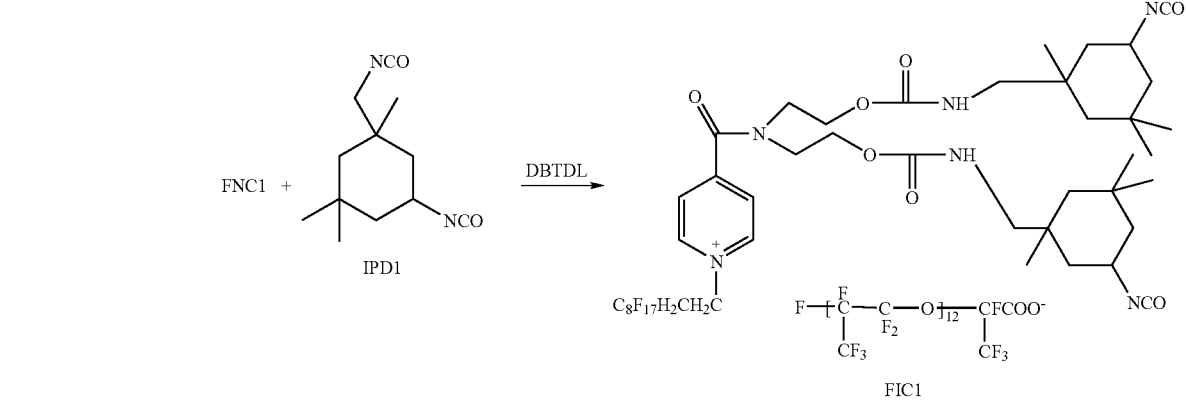

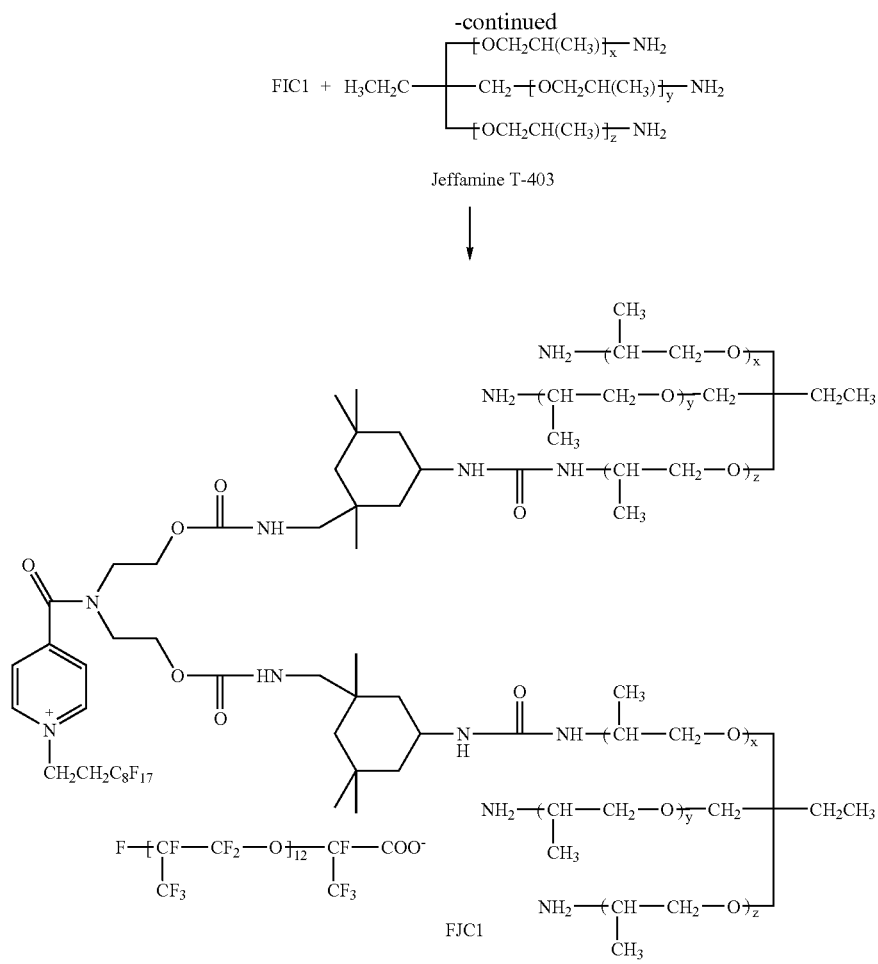

To a solution containing 7.1 gm of thus obtained FNC1 from Preparation 5 in 30 ml of Freon 113 was added 1.0 gm of isophorone diisocyanate and 0.02 gm of 2% dibutyltin dilaurate (DBTDL) acetone solution. The solution was heated to reflux under Ar for 4 hours. The solvent Freon113 was then stripped off. The residue was dissolved in 40 ml of PFS2 and washed with 20 ml of ethyl acetate twice. The separated PFS2 layer was then added dropwise to a solution of 4.5 gm of Jeffamine® T-403 (Huntsman) in 20 ml of Freon 113. The solution was continuously stirred for two hours till IR showed disappearance of the peak at 2200 cm$^{-1}$. The solvent was then stripped off under vacuum and the residue was dissolved in 50 ml of PFS2. 20 Ml of ethyl acetate was used to wash the PFS2 layer three times. The collected PFS2 layer was evaporated under vacuum to yield 5 gm of a yellowish oil. The purity was confirmed by IR.

Preparation 8

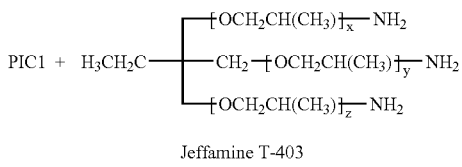

-continued

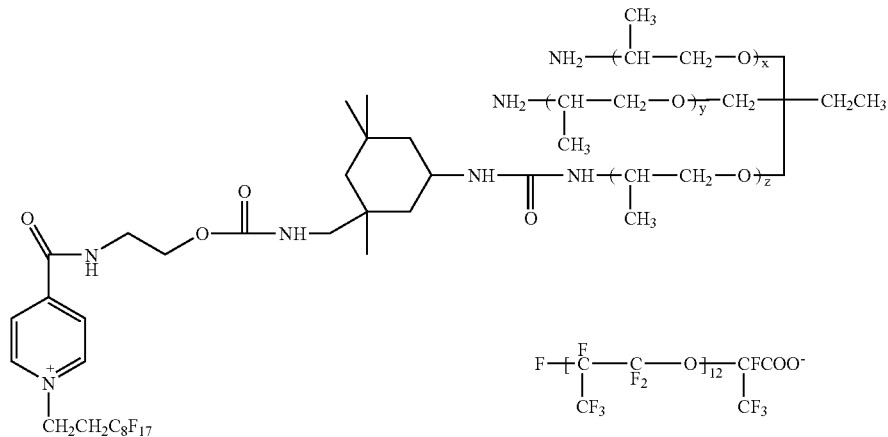

PJC1

To a solution containing 9.3 gm of PNC1 (from Preparation 6) in 40 ml of Freon 113 was added 1.33 gm of isophorone diisocyanate and 0.067 gm of 2% dibutyltin dilaurate acetone solution. The solution was heated to reflux under Ar for 12 hours. The solvent Freon 113 was then stripped off. The residue was dissolved in 40 ml of PFS2 and washed with 20 ml of ethyl acetate twice. The separated PFS2 layer was then added dropwise to a solution of 3 gm of Jeffamine® T-403 (Huntsman) in 20 ml of Freon 113. The solution was continuously stirred for two hours till IR showed disappearance of the peak at 2200 cm$^{-1}$. The solvent was stripped off under vacuum and the residue was dissolved in 50 ml of PFS2. 20 Ml of ethyl acetate was used to wash the PFS2 layer three times. The combined PFS2 layer was evaporated under vacuum to yield 10 gm of a red oil. The purity was confirmed by IR.

Preparation 9

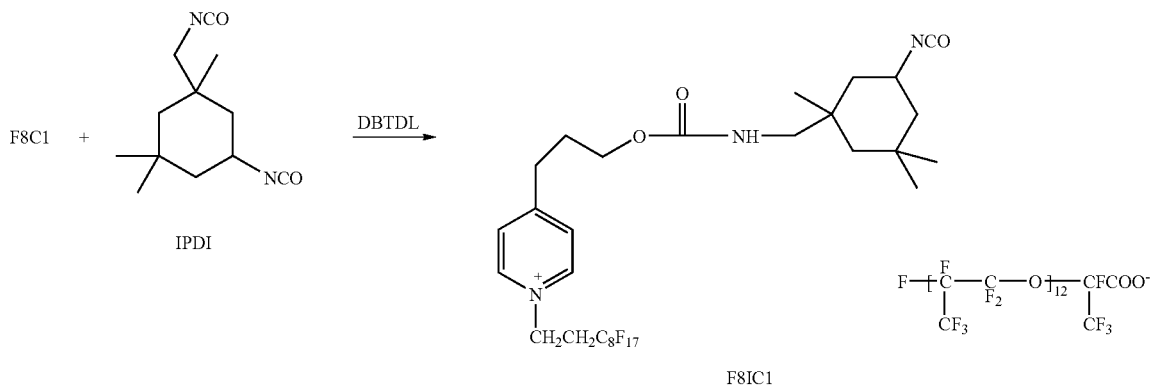

F8IC1 + H$_2$NCH$_2$CH$_2$OCH$_2$CH$_2$OCH$_2$CH$_2$NH$_2$

Jeffamine 148

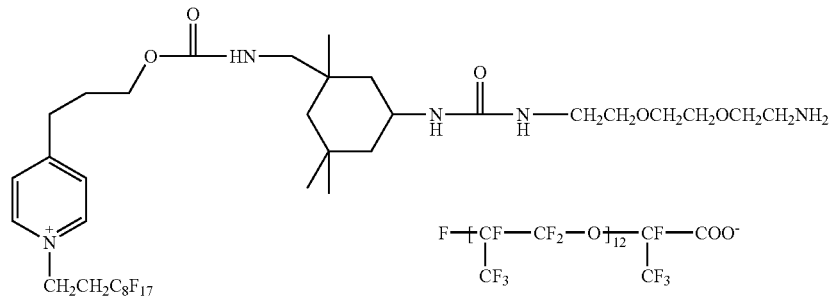

F8DC1

To a solution containing 14.8 gm of F8C1 (from Preparation 4) in 40 ml of Freon 113 was added 5.33 gm of isophorone diisocyanate and 0.26 gm of 2% dibutyltin dilaurate acetone solution. The solution was heated to reflux under Ar for 12 hours. The solvent Freon 113 was then stripped off. The residue was dissolved in 40 ml of PFS2 and washed with 20 ml of ethyl acetate twice. The separated PFS2 layer was then added dropwise to a solution of 2.8 gm of Jeffamine® ED148 (Huntsman) in 20 ml of Freon 113. The solution was continuously stirred for two hours till IR showed disappearance of the peak at 2200 cm$^{-1}$. The solvent was then stripped off under vacuum and the residue was dissolved in 50 ml of PFS2. 20 Ml of ethyl acetate was used to wash the PFS2 layer three times. The combined PFS2 layer was evaporated under vacuum to yield 7 gm of a red oil. The purity of the product was confirmed by IR.

Preparation 10

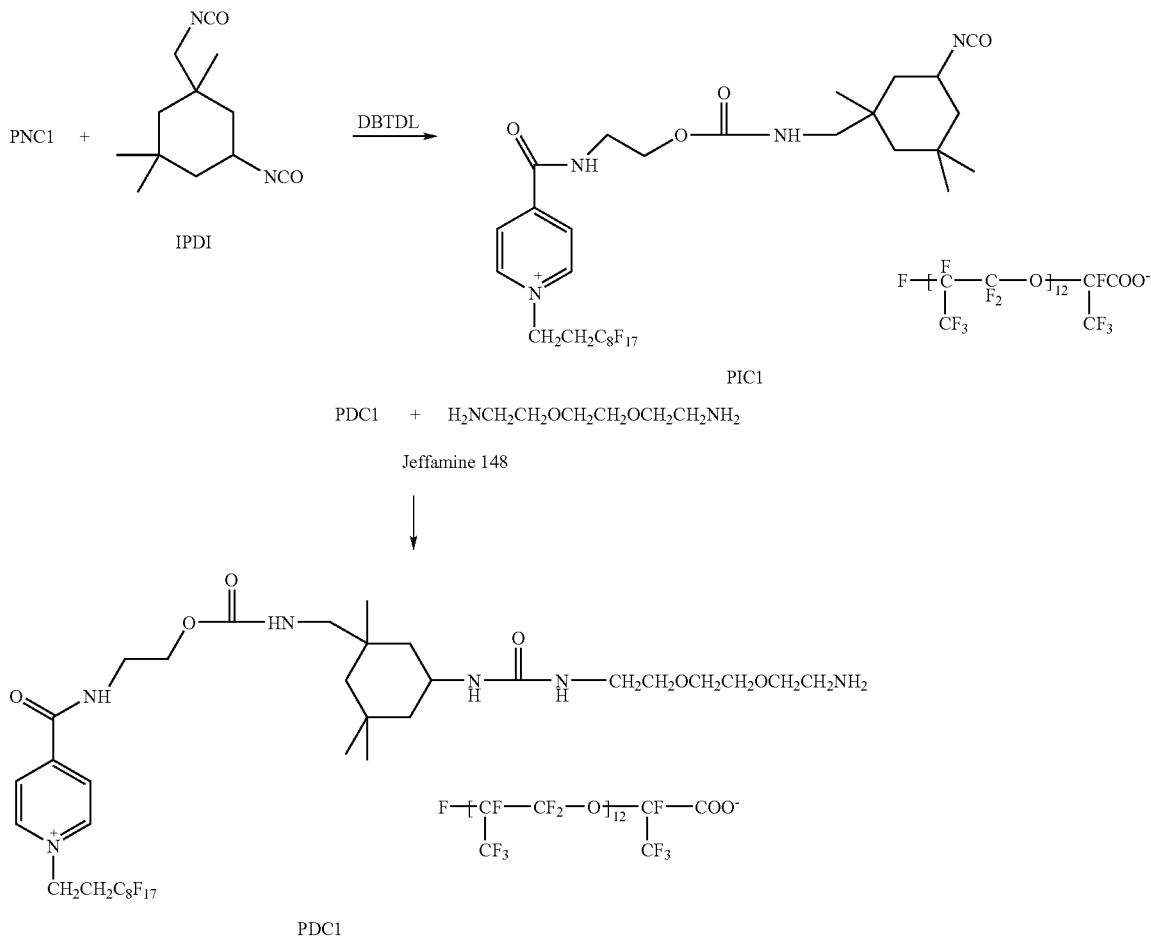

To a solution containing 13 gm of PNC1 (from Preparation 6) in 40 ml of Freon 113 was added 2 gm of isophorone diisocyanate and 0.2 gm of 2% dibutyltin dilaurate acetone solution. The solution was heated to reflux under Ar for 12 hours. The solvent Freon 113 was then stripped off. The residue was dissolved in 40 ml of PFS2 and washed with 20 ml of ethyl acetate twice. The separated PFS2 layer was then added dropwise to a solution of 1.85 gm of Jeffamine® ED148 (Huntsman) in 20 ml of Freon 113. The solution was continuously stirred for two hours till IR showed disappearance of the peak at 2200 cm$^{-1}$. The solvent was stripped off under vacuum and the residue was dissolved in 50 ml of PFS2. 20 Ml of ethyl acetate was used to wash the PFS2 layer three times. The combined PFS2 layer was evaporated under vacuum to yield 11.1 gm of a red oil. The purity of the product was confirmed by IR.

Preparation 11

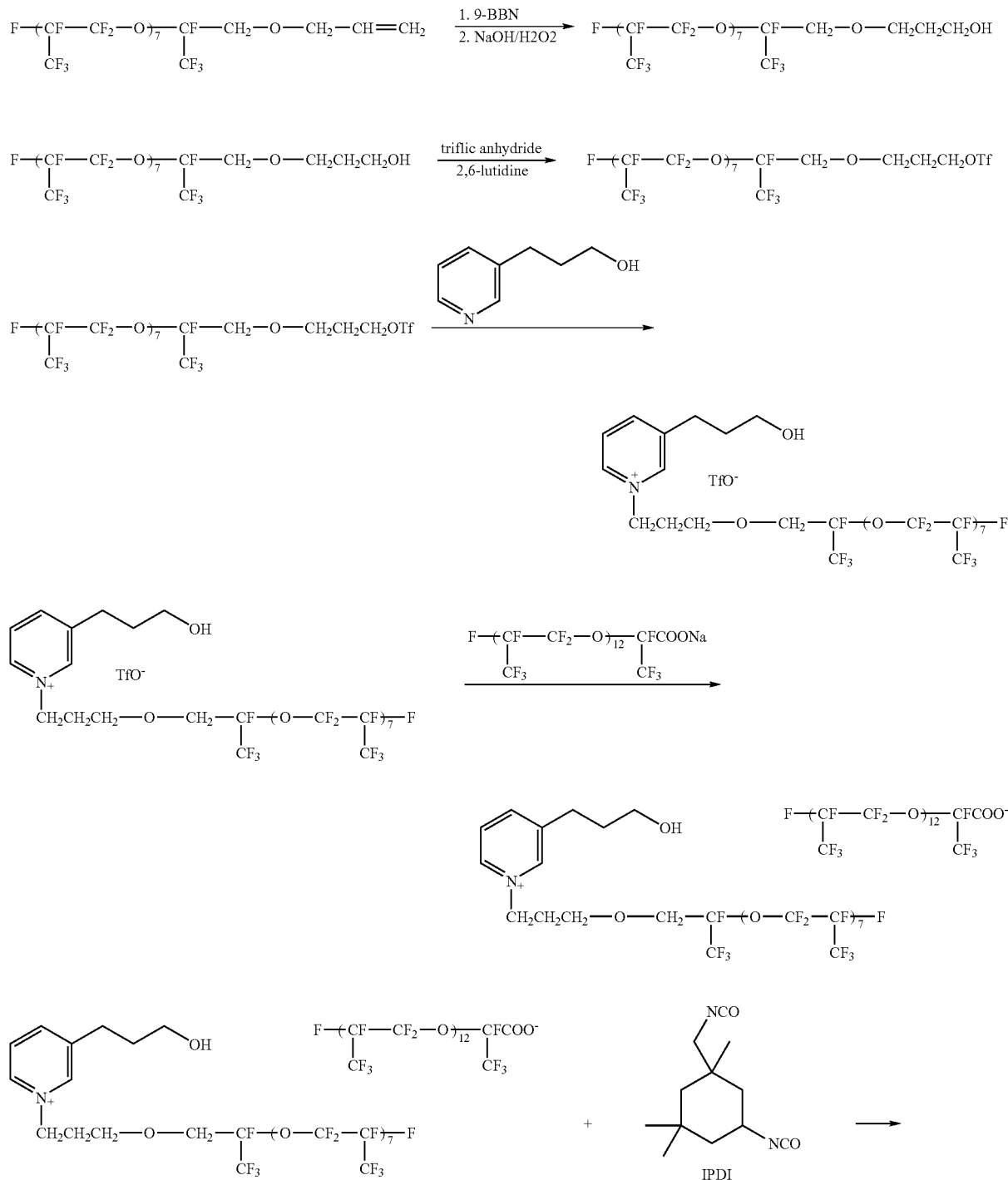

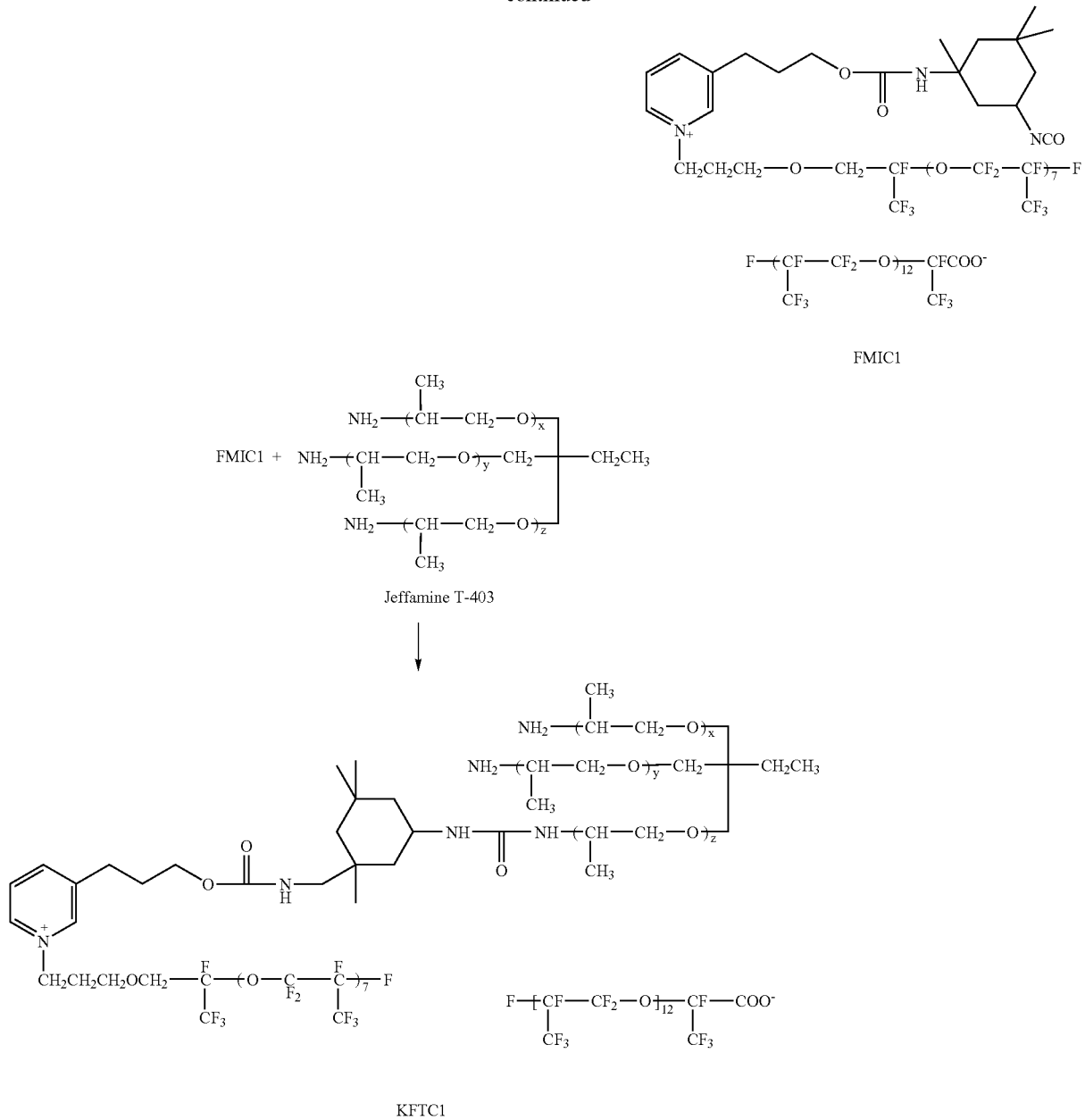

FMIC1

Jeffamine T-403

KFTC1

A. Hydroboration—Oxidation of Krytox Allyl Ether

To a 250 ml three-neck round flask equipped with a magnetic stirrer and an addition funnel was charged with 3 gm of Krytox allyl ether (from DuPont, MW=1700) in 10 ml of HFE-7200 and 5 ml of anhydrous THF under Argon. The flask was cooled in an ice-water bath. 21.23 Ml of 0.45M 9-BBN THF solution (from Callery Chemical) was added dropwise over 20 minutes. The mixture was brought to room temperature and stirred for overnight. 5 Milliliters of ethanol was added slowly, followed by 2.5 ml 6N NaOH solution and 5 ml 30% $H_2O_2$ solution. The mixture was heated to 60° C. for 3 hours, cooled and concentrated, and the residue was partitioned between water and PFS2. The PFS2 layer was separated, washed twice with water, dried over sodium sulfate, and evaporated to yield 2.5 gm of PFPO methyleneoxypropyl alcohol as a colorless oil. IR showed the characteristics O—H band of the product at 3351 $cm^{-1}$.

B. Synthesis of PFPO Methyleneoxypropyl Triflate

10 Gm of the PFPO methyleneoxypropyl alcohol prepared as described above was dissolved in 50 ml of 1,1,2-trifluorotrichloroethane (A-113) and 0.96 gm of 2,6-lutidine under Argon. The mixture was cooled in an ice-water bath. 2.9 Gm of triflic anhydride in 10 ml of A-113 was added dropwise. After 30 minutes, the ice-water bath was removed and the reaction mixture was stirred overnight. The mixture was then washed four times with a NaCl aqueous solution, dried and evaporated to yield 8 gm of the triflate product as a light yellow oil. The triflate was then mixed with 0.7 gm of 4-(3-hydroxypropyl)pyridine in 50 ml of A-113 and 10 ml of methylene chloride. After refluxing overnight, the reaction mixture was evaporated, and the residue was dissolved in PFS-2 and washed with ethyl acetate four times. The solvent was then stripped off to yield 7 gm of the pyridinium triflate product as a viscous liquid.

C. Synthesis of N-perfluoropolypropyleneoxide(PFPO)-methylene-oxypropyl-3-hydroxypropylpyridinium perfluoronolypropyleneoxide(PFPO) carboxylate Anion exchange reaction was performed by first dissolving 7 gm of the pyridinium triflate salt and 8.75 gm of Krytox carboxylate sodium salt in 60 ml of PFS2. The mixture was washed with methanol three times, evaporated to yield 11 gm of the desired pyridinium Krytox carboxylate salt.

D. Synthesis of Diamine terminated prepolymer of N-perfluoropolypropyleneoxide(PFPO)-methyleneoxypropyl-3-hydroxypropylpyridinium perfluoropolypropyleneoxide (PFPO) carboxylate prepolymer 11 Gm of the pyridinium Krytox carboxylate in 50 ml of anhydrous A-113 was added dropwise to a solution containing 2.7 gm of isophorone diisocyanate, 0.0054 gm of dibutyl tin dilaurate and 40 ml of A-113 under reflux over 2 hours. The mixture was then refluxed for another 10 hours, cooled and concentrated. The crude product was dissolved in PFS2 and washed with anhydrous ethyl acetate, and evaporated to yield an oil, which was dissolved in 50 ml of A-113 and added dropwise to a solution containing 5.5 gm Jeffamine T-403 (from Huntsman) and 50 ml of A-113. The reaction mixture was stirred for another 4 hours and evaporated and the residue was dissolved in 100 ml of PFS2 and washed with ethyl acetate and concentrated in vacuum to yield 7.5 gm of the final product. The product was characterized by IR.

Preparation 12

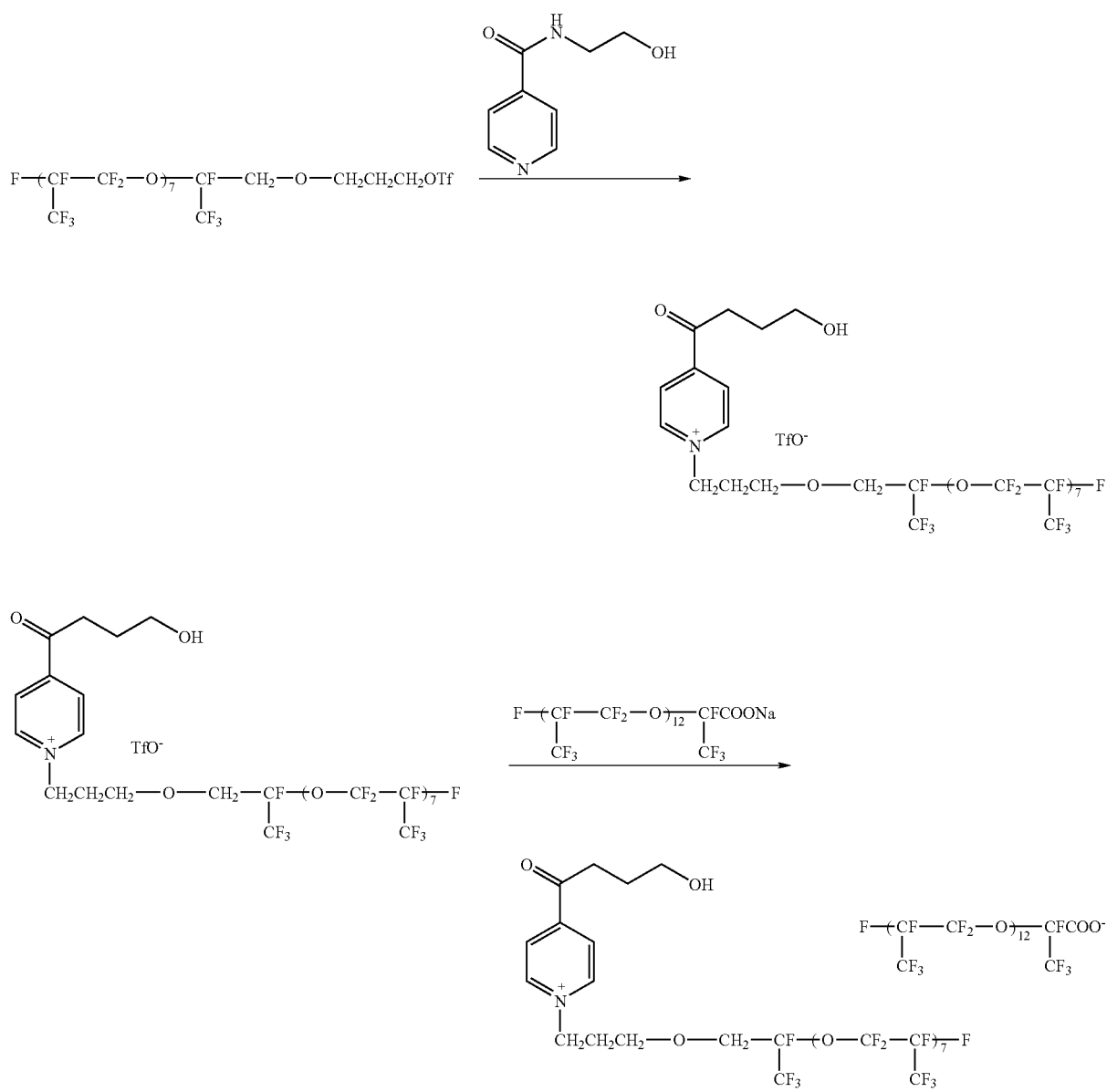

-continued
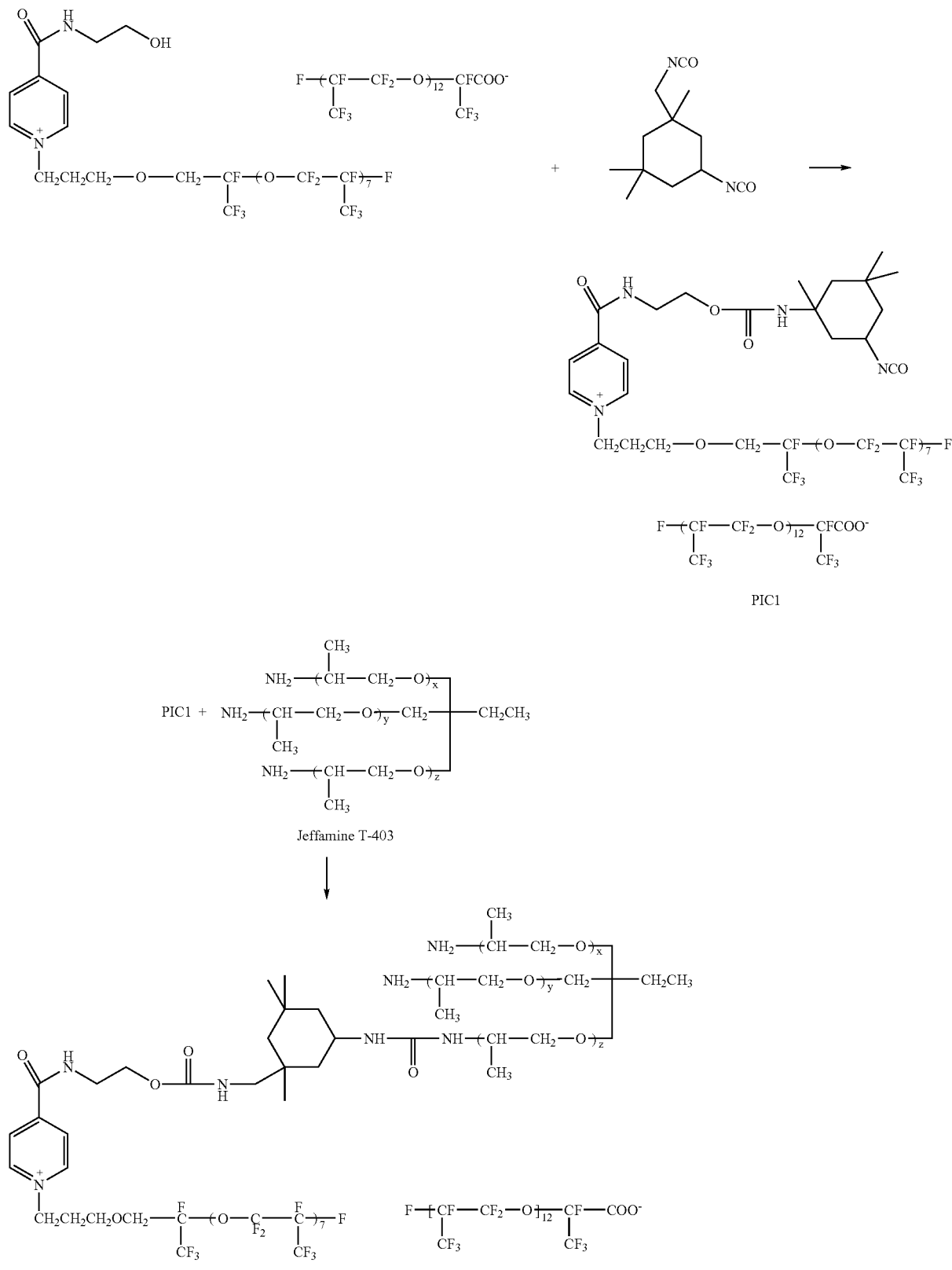

The procedure of Preparation 11 was followed except that N-(2-hydroxyethyl)isonicotinamide was used instead of 4-(3-hydroxypropyl)pyridine.

Preparation 13

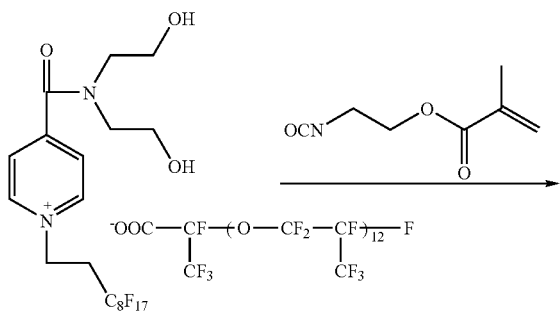

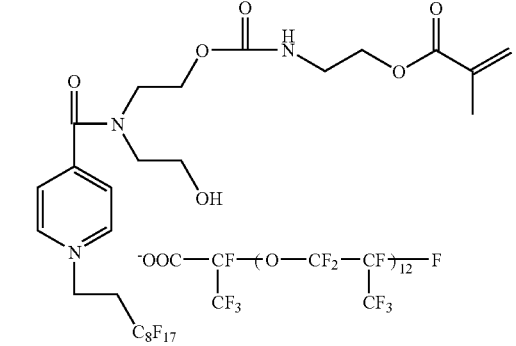

4.6 Gm of FNC1 (from Preparation 5), 0.55 gm of 2-isocyanoethyl methacrylate and 0.03 gm of 2% dibutyltin dilaurate acetone solution were dissolved in 30 ml of Freon 113. The solution was stirred at 45° C. under Argon for four and half hours. The solvent was then evaporated and 30 ml of PFS2 was added in. The solution was washed with ethyl acetate three times (3×30 ml). After the solvent was stripped off, 3.9 gm of the product was obtained. The purity was confirmed by $^1$H NMR.

Preparation 14

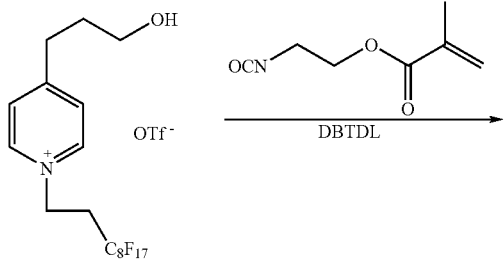

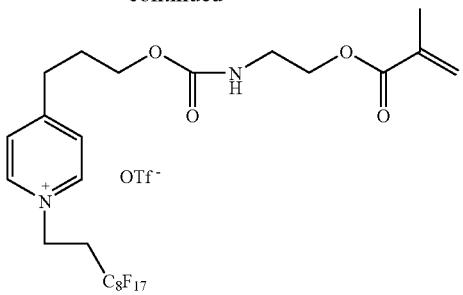

4.13 Gm of F8POH (from Preparation 2) was dissolved in 20 ml of anhydrous acetonitrile. To this solution 0.91 gm of 2-isocyanoethyl methacrylate and 0.09 gm of 2% dibutyltin dilaurate acetone solution was added. The solution was stirred at 45° C. for three hours. The solvent was then stripped off and hexane was added to wash out the extra 2-isocyanoethyl methacrylate (three times). After the solvent was stripped off under high vacuum, 3.8 gm of the product was obtained. The purity of the product was confirmed by $^1$H NMR.

Synthesis of a Reactive Fluorinated Ammonium Salt

Preparation 15

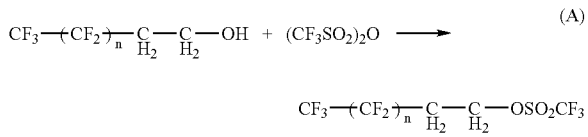

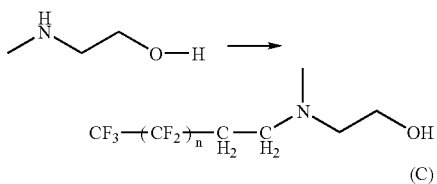

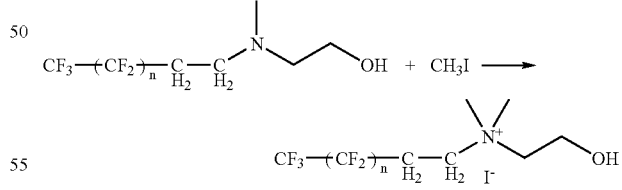

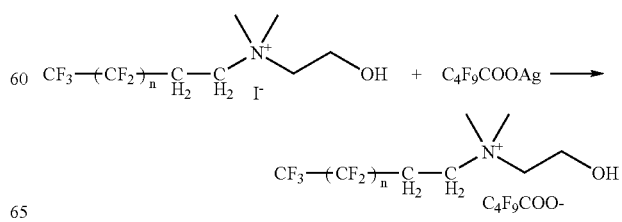

41.9 Gm (90.3 mmol) of 1H,1H,2H,2H-perfluorodecanol and 11.6 gm (108 mmol) of 2,6-lutidine (Aldrich) were dissolved in 540 ml of chloroform and cooled in a 0° C. bath for 20 minutes. To the solution, 30.7 gm (108 mmol) of trifluoromethanesulfonic anhydride (Aldrich) in 360 ml of chloroform was added dropwise with stirring over a period of 30 minutes. The reaction mixture was kept being stirred at room temperature for at least another 8 hours to allow the reaction to complete.

The reaction mixture was then washed with deionized water three times, dried over magnesium sulfate and the solvent was stripped off. The crude product was recrystallized from heptane/methylene chloride, rinsed with heptane and dried under vacuum. 45 Gm (yield: 83.6%) of 1H,1H,2H,2H-perfluorodecyl triflate (Product A; white crystal) was obtained.

14.2 Gm of 2-(methylamino)ethanol was pre-dissolved in 30 ml of methylene chloride and added into a solution containing 45 gm of 1H,1H,2H,2H-perfluorodecyl triflate in 100 ml methylene chloride over a period of 15 minutes with stirring at room temperature. The mixture was then refluxed for another four hours to allow the reaction to complete. The mixture was washed with water three times and dried over magnesium sulfate. After filtration, solvent was stripped off by a rotary evaporator to obtain 47 gm of product (B), methyl(2-hydroxyethyl)-(1H,1H,2H,2H-perfluorodecyl)amine. A purity of 95+% was confirmed by $^1$HNMR.

In a pressure vessel, 10 gm of methyl(2-hydroxyethyl)(1H,1H,2H,2H-perfluorodecyl)amine (MW=521) and 5.45 gm of methyl iodide were dissolved into 15 ml of 1,1,2-trichlorotrifluoroethane. The pressure vessel was sealed and heated to 60° C. with stirring. A white solid was precipitated out after about an hour and reaction was allowed to continue for another 60 hours at 60° C. The white precipitate was isolated by filtration and recrystallized from a mixture of 1,1,2-trichlorotrifluoroethane and acetone to obtain 10.2 gm of fluorinated quaternary ammonium iodide salt (C), dimethyl(2-hydroxyethyl)-(1H,1H,2H,2H-perfluorodecyl)ammonium iodide. The product and purity were confirmed by $^1$HNMR and $^{19}$FNMR.

To a solution containing 10 gm of the fluorinated quaternary ammonium iodide salt (C) and 80 ml of acetonitrile, a solution of 4.8 gm of silver perfluorobutyrate in 20 ml of acetonitrile was added drop-by-drop. A yellow precipitate formed almost immediately, filtered, dried over magnesium sulfate and the solvent was stripped off to obtain 11 gm of product (D). The product and purity were also confirmed by $^1$HNMR and $^{19}$FNMR.

Preparation 16

Preparation 16A: Primer Coated Transparent Conductor Film

A primer coating solution containing 33.2 gm of EB 600™ (acrylated epoxy oligomer, UCB, Smyrna, Ga.), 16.12 gm of SR 399™ (pentafunctional monomer, Sartomer, Exton, Pa.), 16.12 gm of TMPTA (trimethylolpropane triacrylate, UCB, Smyrna, Ga.), 20.61 gm of HDDA (UCB, Smyrna, Ga.), 2 gm of Irgacure™ 369 (2-benzyl-2-(dimethylamino)-1-[4-(4-morpholinyl)phenyl]-1-butanone, Ciba, Tarrytown, N.Y.), 0.1 gm of Irganox™ 1035 (thiodiethylene bis(3,5-di(tert)-butyl-4-hydroxyhydrocinnamate, Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes, then exposed to 1.8 J/cm$^2$ of UV light under nitrogen using a UV conveyer (DDU, Los Angles, Calif.).

Preparation 16B: Preparation of Microcups

TABLE 1

| Microcup Composition | | |
|---|---|---|
| Component | Weight Part | Source |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (Isopropyl-9H-thioxanthen-9-one, Aldrich, Milwaukee, Wis.), 0.1 gm of Irganox™ 1035 (Ciba, Tarrytown, N.Y.) and 20.61 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 72 µm (length)×72 µm (width)×35 µm (depth)×13 µm (width of top surface of the partition wall between cups) microcups. A plastic blade was used to remove excess of fluid and gently squeezed into "valleys" of the Ni mold. The coated Ni mold was heated in an oven at 65° C. for 5 minutes and laminated with the primer coated ITO/PET film prepared in Preparation 16A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm$^2$ was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm$^2$.

Preparation 16C: Filling and Sealing with a Sealing Composition

1 Gm of an electrophoretic dispersion containing 6% by weight (dry weight) of the TiO$_2$ microparticles prepared according to the procedures described later in the Examples 1, 2 and 3 and 1.3% by weight of a perfluorinated Cu-phthalocyanine dye (CuPc-R$_f$; wherein R$_f$=C$_8$F$_{17}$, and a+b+c+d=4) in HT-200 (Solvay Solexis) was filled into the 4"×4" microcup array prepared from Preparation 16B using a #0 drawdown bar. The excess of fluid was scraped away by a rubber blade. The filled microcups were then overcoated with a 10% rubber solution consisting of 9 parts of Kraton G1650 (styrene-ethylene/butylenes-styrene block copolymer, Shell, Tex.), 1 part of GRP 6919 (hydrogenated styrene block copolymer, Shell), 3 parts of Cab-O-Sil TS-720

(treated fumed silica, Cabot Corp., IL), 78.3 parts of Isopar E (hydrocarbon fluid, Exxon Mobil) and 8.7 part of isopropyl acetate, by a Universal Blade Applicator and dried at room temperature to form a seamless sealing layer of about 2–3 μm dry thickness with good uniformity.

Preparation 16D: Lamination

The ITO side of an ITO/PET conductor film (5 mil OC50 from CPFilms) was overcoated with a 25% by weight solution of a pressure sensitive adhesive (Durotak 1105, National Starch, Bridgewater, N.J.) in methyl ethyl ketone (MEK) by a drawdown bar (targeted coverage: 0.6 gm/ft$^2$). The adhesive coated ITO/PET layer was then laminated over the sealed microcups prepared from Preparation 16C with a GBC Eagle 35 laminator at 70° C. The lamination speed was set at 1 ft/min with a gap of 1/32".

Example 1

Comparative Example 9.50 Gm of Desmodur® N3400 aliphatic polyisocyanate (from Bayer AG) and 0.49 gm of triethanolamine (99%, Dow) were dissolved in 3.79 gm of acetone (99.9% minimum by GC, Burdick & Jackson). To the resultant solution, 13 gm of TiO$_2$ (Ti-Pure® R706 DuPont) was added and homogenized for 2 minutes with a rotor-stator homogenizer (IKA ULTRA-TURRAX T25, IKA WORKS) at ambient temperature. A solution containing 1.67 gm of 1,5-pentanediol (BASF), 1.35 gm of polypropylene oxide (mw=725 from Aldrich) and 2.47 gm of acetone was added and homogenized for 1 minute; and finally 0.32 gm of a 2% dibutyltin dilaurate (Aldrich) solution in acetone was added and further homogenized for 1 minute. In the final step, 0.9 gm of Rf-amine 4900 from Preparation 1 in 40.0 gm of HT-200 (Solvay Solexis) was added and homogenized for 2 minutes, followed by addition of additional 0.9 gm of Rf-amine 4900 from Preparation 1 in 33.0 g of HT-200 and homogenization for 2 minutes. A microparticle dispersion with low viscosity was obtained.

A microparticle dispersion of low viscosity was obtained. The microparticle dispersion was then heated at 50° C. overnight and then at 80° C. for an additional hour under low shear stirring to post-cure the particles. The post-cured microparticle dispersion was filtered through a 400 mesh (38 micrometer) screen.

The particle size distribution of the filtered dispersion was measured with a Beckman Coulter LS230 Particle Analyzer. The mean particle diameter was 1.74 μm and the standard deviation was 1.12 μm.

Example 2

Microparticles Containing a Reactive Pyridinium Salt

The entire procedure of Example 1 was followed except that a solution containing 0.45 gm of F8POH prepared from Preparation 2, 1.67 gm of 1,5-pentanediol (BASF), 1.35 gm of polypropylene oxide (mw=750, from Aldrich) and 2.47 gm acetone (99.9% minimum by GC, Burdick & Jackson) was added to the TiO$_2$ slurry and homogenized for 1 minute.

A microparticle dispersion of low viscosity was obtained. The microparticle dispersion was then heated at 50° C. overnight and then at 80° C. for an additional hour under low shear stirring to post-cure the particles. The post-cured microparticle dispersion was filtered through a 400 mesh (38 micrometer) screen.

The particle size distribution of the filtered dispersion was measured with a Beckman Coulter LS230 Particle Analyzer. The mean diameter was 1.02 μm and the standard deviation was 0.34 μm. The size distribution of the particle dispersion was much improved (i.e., smaller mean particle diameter and narrower size distribution) when a reactive pyridinium salt was used.

The filtered dispersion was centrifuged for 15 minutes at 3600 rpm in an IEC CENTRAMP4 centrifuge. The middle phase of the centrifuged sample was used to prepare an EPD dispersion containing 1.3% by weight of CuPc-C$_8$F$_{17}$ and 6% by weight (dry weight) of the microparticles in HT-200. The resultant EPD dispersion was filled into the microcups which were then sealed and sandwiched between two ITO/PET films according to the procedure described in the Preparation 16. The contrast ratio, t$_{on}$ and t$_{off}$ of the resultant EPD at 40V were 5.3, 235 msec and 190 msec, respectively.

Example 3

Microencapsulation Process with a Reactive Pyridinium Salt in the Internal Phase and a Cu Phthalocyanine in the Continuous Phase The entire procedure of Example 1 was followed except that a solution containing 0.45 gm of F8POH prepared from Preparation 2, 1.67 gm of 1,5-pentanediol (BASF), 1.35 gm of polypropylene oxide (mw=750, from Aldrich) and 2.47 gm acetone (99.9% minimum by GC, Burdick & Jackson) was added to the TiO2 slurry and homogenized for 1 minute and in the final step, 0.9 gm of Rf-amine4900 from Preparation 1 in 40.0 gm of HT-200 (Solvay Solexis) was first added and homogenized for 2 minutes, followed by addition of additional 0.9 gm of the Rf-amine4900 and 0.35 gm of a perfluorinated Cu phthalocyanine dye, CuPc-C$_8$F$_{17}$ (prepared according to U.S. Pat. No. 3,281,426), in 33.0 gm of HT-200 and homogenization for 2 minutes.

A microparticle dispersion of low viscosity was obtained. The microparticle dispersion was then heated at 50° C. overnight and then at 80° C. for an additional hour under low shear stirring to post-cure the particles. The post-cured microparticle dispersion was filtered through a 400 mesh (38 micrometer) screen.

The filtered dispersion was centrifuged for 15 minutes at 3600 rpm in an IEC CENTRA MP4 centrifuge. The middle phase of the centrifuged sample was used to prepare the EPD dispersion containing 1.3% by weight of CuPc-C$_8$F$_{17}$ and 6% by weight (dry weight) of the microparticles in HT-200. The contrast ratio, t$_{on}$ and t$_{off}$ of the resultant EPD at 40V were 9.8, 105 msec and 130 msec, respectively.

Example 4

Comparative Example 8.93 Gm of Desmodur® N3400 aliphatic polyisocyanate (from Bayer AG) was dissolved in 6.75 gm of acetone (from Burdick & Jackson) and homogenized for 10 seconds with a rotor-stator homogenizer (IKA ULTRA-TURRAX T25, IKA WORKS) at ambient temperature. To the resultant solution, 13.61 gm of TiO$_2$ (Ti-Pure® R706 from DuPont) was added and homogenized for 2 minutes. To the resultant TiO$_2$ dispersion, a solution containing 1.42 gm of 1,5-pentanediol (BASF), 0.30 gm of triethanolamine (99%, Dow), 2.75 gm of polypropylene oxide (MW=725, from Aldrich) and 1.25 gm of acetone was added and homogenized for 1 minute. Then, 0.37 gm of a 2% dibutyltin dilaurate (Aldrich) solution in acetone was added and homogenized for 1 minute and 30 seconds. In the final step, 40.0 gm of HT-200 (Solvay Solexis) containing 2.1 gm of Rf-amine4900 (prepared from Preparation 1) was added and homogenized for 4 minutes. The resultant microparticle dispersion was then heated at 80° C. overnight and stirred under low shear to post cure the microparticles.

The post-cured microparticle dispersion was filtered through a 30-μm Nylon net filter (Millipore) and the solid content of the filtered dispersion was measured by an IR-200 Moisture Analyzer (Denver Instrument Company).

The filtered microparticle dispersion was used to prepare an EPD fluid containing 1.3 wt % of CuPc-$C_8F_{17}$ and 6 wt % (dry weight) of the microparticles in HT-200. The resultant EPD fluid was filled into the microcups, sealed and sandwiched between two ITO/PET films according to the procedures described in the Preparation 16. The contrast ratio, $t_{on}$ and $t_{off}$ of the result EPD at 40V were 8.9, 250 msec and 487 msec, respectively.

Example 5

Microencapsulation Process with a Pyridinium Salt in the Internal Phase

The entire procedure of Example 4 was followed, except that a solution containing 0.4 gm of F8POH (prepared from Preparation 2), 1.42 gm of 1,5-pentanediol (BASF), 0.30 gm of triethanolamine (99%, Dow), 2.75 gm of polypropylene oxide (MW=725, from Aldrich) and 1.25 gm of acetone was added to the $TiO_2$ slurry and homogenized for 1 minute.

The microparticle dispersion was post-cured and filtered, and an EPD was prepared in the same manner as described in Example 4. The contrast ratio, $t_{on}$ and $t_{off}$ of the result EPD at 40V were 9.6, 137 msec and 400 msec, respectively.

Example 6

Microencapsulation Process with a Pyridinium Salt in the Continuous Phase

The entire procedure of Example 4 was followed, except that in the final step, a solution containing 10 gm of HT-200 and 0.4 gm of FNC1 (prepared from Preparation 5) was added first and homogenized for 1 minute and then a solution containing 30 gm of HT-200 and 2.1 gm of Rf-amine4900 was added and homogenized for another 4 minutes.

The microparticle dispersion was post-cured and filtered, and an EPD was prepared in the same manner as described in Example 4. The contrast ratio, $t_{on}$ and $t_{off}$ of the result EPD at 40V were 8.7, 125 msec and 312 msec, respectively.

Example 7

Microencapsulation Process with a Pyridinium Salt in the Internal Phase and Another Pyridinium Salt in the Continuous Phase The entire procedure of Example 5 was followed, except that in the final step, a solution containing 10 gm of HT-200 and 0.4 gm of FNC1 (prepared from Preparation 5) was added first and homogenized for 1 minute and then a solution containing 30 gm of HT-200 and 2.1 gm of Rf-amine4900 was added and homogenized for another 4 minutes.

The microparticle dispersion was post-cured and filtered, and an EPD was prepared in the same manner as described in Example 4. The contrast ratio, $t_{on}$ and $t_{off}$ of the result EPD at 40V were 9.1, 162 msec and 288 msec, respectively.

It can be seen from the above examples that the use of a fluorinated quaternary nitrogen salt has produced EPD dispersions with a narrow particle size distribution and improved contrast ratios, rising times $t_{on}$ and falling times $t_{off}$.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A method for improving the particle size and size distribution of electrophoretic microparticles and the performance of an electrophoretic display, which method comprises:

a) adding a fluorinated quaternary nitrogen salt into a precursor/internal phase, or a continuous phase, or both the precursor/internal phase and the continuous phase, wherein the precursor/internal phase comprises a polymer and the continuous phase comprises a fluorinated solvent or solvent mixture;

b) emulsifying the precursor/internal phase into a continuous phase to form an emulsion; and c) forming electrophoretic microparticles by hardening the emulsion.

2. The method of claim 1 wherein said fluorinated quaternary nitrogen salt is a fluorinated pyridinium, fluorinated quinolinium, fluorinated ammonium, fluorinated acridinium, fluorinated azolium or a fused ring derivative thereof.

3. The method of claim 1 wherein said fluorinated quaternary nitrogen salt is represented by the following formulas:

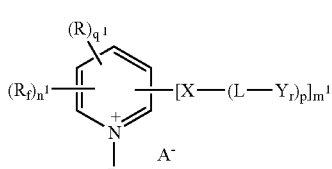

Structure (P-1)

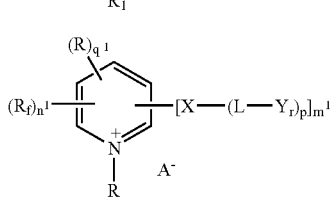

Structure (P-2)

-continued

Structure (P-3)
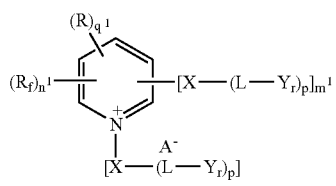

Structure (Q-1)
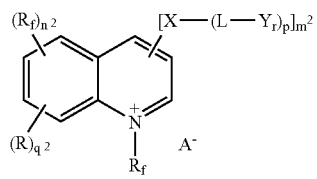

Structure (Q-2)
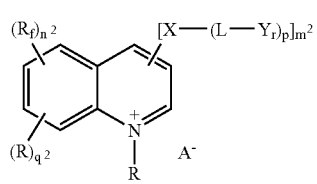

Structure (Q-3)
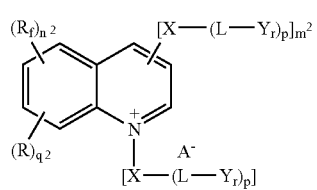

Structure (A-1)
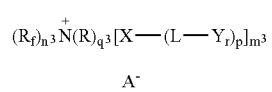

Structure (A-2)
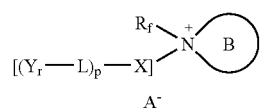

Structure (A-3)
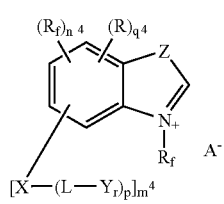

Structure (A-4)
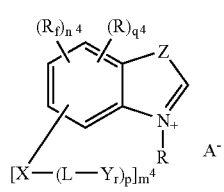

Structure (A-5)
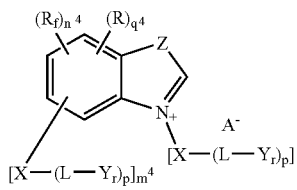

-continued

Structure (A-6)
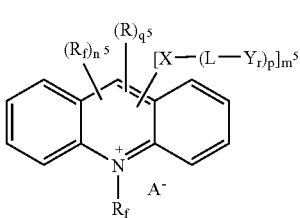

Structure (A-7)
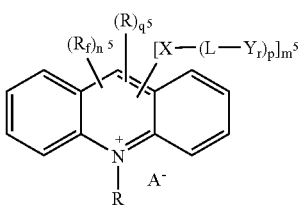

Structure (A-8)
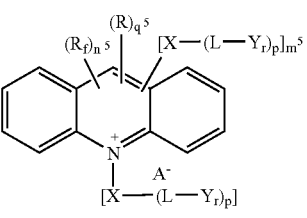

Structure (A-9)
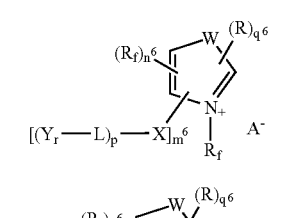

Structure (A-10)
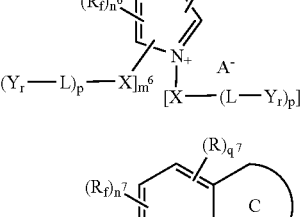

Structure (A-11)
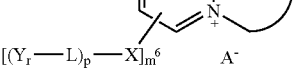

Structure (A-12)
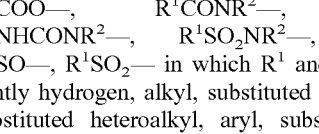

wherein:

$A^-$ is a counterion,

R is chlorine, bromine, iodine, cyano, nitro, alkyl, substituted alkyl, heteroalkyl, substituted heteroalkyl, aryl, substituted aryl, heteroaryl, substituted heteroaryl, $R^1O$—, $R^1S$—, $R^1R^2N$—, $R^1CO$—, $R^1OCO$—, $R^1COO$—, $R^1CONR^2$—, $R^1R^2NCO$—, $R^1NHCONR^2$—, $R^1SO_2NR^2$—, $R^1R^2NSO_2$—, $R^1SO$—, $R^1SO_2$— in which $R^1$ and $R^2$ are independently hydrogen, alkyl, substituted alkyl, heteroalkyl, substituted heteroalkyl, aryl, substituted aryl, heteroaryl or substituted heteroaryl;

$R_f$ is fluorine, a fluorinated derivative of any one of alkyl, substituted alkyl, heteroalkyl, substituted heteroalkyl, aryl, substituted aryl, heteroaryl or substituted heteroaryl or a fluorinated oligomer or polymer; provided that $R_f$ is not fluorine when $R_f$ is bonded to nitrogen;

W is —S— or is —NR$^3$— in which R$^3$ is hydrogen, alkyl, substituted alkyl, heteroalkyl, aryl, substituted aryl, heteroaryl or substituted heteroaryl;

X is a linking group;

L is absent or a di-, tri- or tetra-valent linking chain;

Y is a reactive functional group;

Z is —O— or —S—, or is —CR$^4_2$— or —NR$^4$— in which each R$^4$ is independently hydrogen, alkyl, substituted alkyl, heteroalkyl, substituted heteroalkyl, aryl, substituted aryl, heteroaryl or substituted heteroaryl;

r is 1–3;

p is 1–5;

$m^1$, $n^1$ and $q^1$ are independently integers from 0–5, and $m^1+n^1+q^1 \leq 5$;

$m^2$, $n^2$, and $q^2$ are independently integers from 0–7 and $m^2+n^2+q^2 \leq 7$;

$m^3$, $n^3$, and $q^3$ are independently integers from 0–4, and $m^3+n^3+q^3=4$;

$m^4$, $n^4$, and $q^4$ are independently integers from 0–5, and $m^4+n^4+q^4 \leq 5$;

$m^5$, $n^5$, and $q^5$ are independently integers from 0–9, and $m^5+n^5+q^5 \leq 9$;

$m^6$, $n^6$, and $q^6$ are independently integers from 0–3, and $m^6+n^6+q^6 \leq 3$;

$m^7$, $n^7$, and $q^7$ are independently integers from 0–6, and $m^7+n^7+q^7 \leq 6$;

the ring B is a saturated or unsaturated monocyclic or fused bi- or tricyclic ring having 4–13 ring atoms, optionally comprising one or two ring heteroatoms selected from the group consisting of O, S and NR* wherein R* is hydrogen or an alkyl of 1-12 carbon atoms, such that structure A-2 is an optionally substituted pyrrolidinium, piperidinium or morpholinium salt provided that the ring B is not an aromatically unsaturated ring; and the ring C is an aromatic monocyclic or fused bi- or tricyclic ring having 4–12 ring atoms, optionally comprising 1–4 ring heteroatoms selected from the group consisting of O, S and NR* wherein R* is hydrogen or an alkyl of 1-12 carbon atoms, such that structure A-12 is an optionally substituted quinolizinylium salt, provided that the fluorinated quaternary nitrogen salt comprises at least 10% by weight of fluorine.

4. The method of claim 3 wherein said counterion is an inorganic anion, an optionally fluorinated alkyl-, heteroalkyl-, aryl-, or heteroaryl-carboxylate and -sulfonate anion, a $R_f$-substituted-carboxylate or -sulfonate anion or an anion of optionally fluorinated di(alkylsulfonyl)imide.

5. The method of claim 4 wherein said inorganic anion is F$^-$, Cl$^-$, Br$^-$, I$^-$, NO$_3^-$, NO$_2^-$, MnO$_4^-$, PF$_6^-$, AsF$_6^-$ and SbF$_6^-$ or a borate ion.

6. The method of claim 4 wherein said optionally fluorinated alkylcarboxylate anion is $C_aH_bF_{(2a+1-b)}CO_2^-$ wherein a is 1–30 and b is determined based on the fluorine content.

7. The method of claim 4 wherein said optionally fluorinated alkylsulfonate anion is $C_aH_bF_{(2a+1-b)}SO_3^-$ wherein a is 1–30 and b is determined based on the fluorine content.

8. The method of claim 4 wherein said optionally fluorinated arylcarboxylate or -sulfonate anion is $C_aH_bF_{(2a-7-b)}CO_2^-$ or $C_aH_bF_{(2a-7-b)}SO_3^-$ wherein a is 6–30 and b is determined based on the fluorine content.

9. The method of claim 4 wherein said optionally fluorinated arylcarboxylate or -sulfonate anion is $C_aH_bF_{(2a-13-b)}CO_2^-$ or $C_aH_bF_{(2a-13-b)}SO_3^-$ wherein a is 10–30 and b is determined based on the fluorine content.

10. The method of claim 4 wherein said anion of optionally fluorinated di(alkylsulfonyl)imide is $[C_aH_bF_{(2a+1-b)}SO_2]_2N^-$ wherein a is 1–30 and b is determined based on the fluorine content.

11. The method of claim 4 wherein the $R_f$ in the $R_f$-substituted-carboxylate or -sulfonate anion is represented by the following formula:

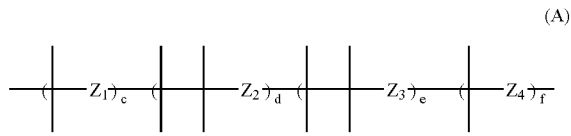

(A)

wherein:

the undesignated open positions are independently substituted by hydrogen, halogen, alkyl, aryl, alkylaryl, arylalkyl, fluoroalkyl, fluoroaryl, fluoroalkylaryl, alkylfluoroaryl, fluoroarylalkyl, arylfluoroalkyl, —OR$^5$, —OC(O)R$^6$, —C(O)OR$^5$, —C(O)NR$^5$R$^6$ or a substituted derivative thereof, wherein R$^5$ and R$^6$ are independently hydrogen, halogen, alkyl, aryl, alkylaryl, arylalkyl, fluoroalkyl, fluoroaryl, fluoroalkylaryl, alkylfuoroaryl, fluoroarylalkyl, arylfluoroalkyl or a fluorinated polyether and substituted derivatives thereof;

c, d, e and f may be independently 0–20; and $Z_1$, $Z_2$, $Z_3$ and $Z_4$ are independently oxygen or absent.

12. The method of claim 11 wherein said open positions are independently substituted fluorine or a fluorinated alkyl.

13. The method of claim 12 wherein said fluorinated alkyl is a fluorinated methyl.

14. The method of claim 11 wherein said $R_f$-substituted carboxylates or -sulfonates are $F(C_3F_6O)_dCF(CF_3)CO_2^-$, $F(C_3F_6O)_dCF_2CF_2CO_2^-$, $CF_3O(C_2F_4O)_dCF_2CO_2^-$, $F(C_2F_4O)_dCF_2CO_2^-$, $F(C_3F_6O)_dCF(CF_3)SO_3^-$, $F(C_3F_6O)_dCF_2CF_2SO_3^-$, $CF_3O(C_2F_4O)_dCF_2SO_3^-$ or $F(C_2F_4O)_dCF_2SO_3^-$ wherein d is 1–20.

15. The method of claim 3 wherein X is alkylene, heteroalkylene, arylene, heteroarylene, oxyalkylene, oxyarylene, —(OCHR$^7$CHR$^8$)$_g$—, —(CHR$^7$CHR$^8$O)$_g$—, —CO—, —C(O)O—, —OC(O)—, —C(O)NR$^7$—, —C(O)N<, —C(O)NH—, —NR$^7$—, —N=, —NR$^7$C(O)— in which R$^7$ and R$^8$ are independently hydrogen, alkyl, substituted alkyl, heteroalkyl, substituted heteroalkyl, aryl, substituted aryl, heteroaryl or substituted heteroaryl and g is 1–300.

16. The method of claim 3 wherein L is absent or a linking chain comprising one or more of the following moieties, connected together but not in any particular order: alkylene, heteralkylene, arylene, heteroarylene, polyether, fluoropolyether or a linking moiety.

17. The method of claim 3 wherein L is a linking chain comprising one or more of the following moieties, connected together but not in any particular order: alkylene, heteroalkylene, arylene, heteroarylene, polyether, fluoropolyether, —O—, —HN—, >N—, —S—, —CO—, —C(O)O—, —O(O)C—, —NHC(O)—, >NC(O)—, —NHC(O)O—, —OC(O)NH—, —C(O)NH—, —C(S)NH—, —NHC(O)NH—, —NHC(S)NH—, —SC(O)NH— or —NHC(O)S—.

18. The method of claim 3 wherein Y is HO—, HS—, H₂N—, NCO—, NCS—, HO(O)C—, epoxy, aziridinyl, carbodiimide, a short chain alkoxysilyl, a carboxylic acid derivative, chloroformate, vinyl or other functional groups capable of undergoing polymerization or crosslinking.

19. The method of claim 18 wherein said vinyl is —CH═CH₂, —OCH═CH₂, —OCOCH═CH₂, —OCOC(CH₃)═CH₂, —OOCCH═CHCOOH or —(C₆H₄)—CH═CH₂.

20. The method of claim 3 wherein said fluorinated quaternary nitrogen salts are represented by P-1 and A-1.

21. The method of claim 3 wherein said counterion, A⁻, is an optionally fluorinated alkyl- or aryl-carboxylate or -sulfonate anion or a R$_f$-substituted-carboxylate or -sulfonate anion.

22. The method of claim 3 wherein m¹–m⁷ is 1 and p and r are independently 1 or 2.

23. The method of claim 3 wherein R is an alkyl.

24. The method of claim 3 wherein R$_f$ is preferably a fluorinated alkyl or a fluorinated oligomer or polymer of the following formula:

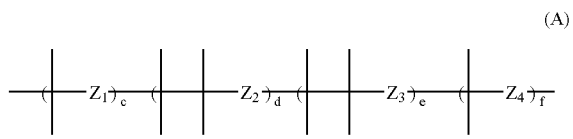

(A)

wherein:
the undesignated open positions are independently substituted by hydrogen, halogen, alkyl, aryl, alkylaryl, arylalkyl, fluoroalkyl, fluoroaryl, fluoroalkylaryl, alkylfluoroaryl, fluoroarylalkyl, arylfluoroalkyl, —OR⁵, —OC(O)R⁶, —C(O)OR⁵, —C(O)NR⁵R⁶ or a substituted derivative thereof, wherein R⁵ and R⁶ are independently hydrogen, halogen, alkyl, aryl, alkylalkyl, fluoroalkyl, fluoroaryl, fluoroalkylaryl, alkylfuoroaryl, fluoroarylalkyl, arylfluoroalkyl or a fluorinated polyether and substituted derivatives thereof;

c, d, e and f may be independently 0–20; and

Z₁, Z₂, Z₃ and Z₄ are independently oxygen or absent.

25. The method of claim 3 wherein X is an alkylene chain and L is absent.

26. The method of claim 25 wherein Y is preferably HO— or H₂N—.

27. The method of claim 3 wherein X is —C(O)N< or —C(O)NH— and L is an alkylene chain.

28. The method of claim 27 wherein Y is HO— or H₂N—.

29. The method of claim 3 wherein X is an alkylene chain, L is a linking chain comprising one or more of the following, connected together but not in any particular order: alkylene(s), >N—, —O—, —OC(O)NH—, —NHC(O)—, —(O)CNH—, —NHC(O)NH—, polyether or fluoropolyether and Y is HO—, H₂N— or —OCOC(CH₃)═CH₂.

30. The method of claim 29 wherein L is a linking chain comprising one or more of the following, connected together but not in any particular order: alkylene(s), —OC(O)NH—, —NHC(O)NH— or polyether and Y is —NH₂.

31. The method of claim 29 wherein L is a linking chain comprising one or more of the following, connected together but not in any particular order: alkylene(s), >N—, —OC(O)NH— or —NHC(O)NH— and Y is —NH₂.

32. The method of claim 29 wherein L is a linking chain comprising one or more of the following, connected together but not in any particular order: alkylene(s) or —OC(O)NH— and Y is —OCOC(CH₃)═CH₂.

33. The method of claim 29 wherein L is a linking chain comprising one or more of the following, connected together but not in any particular order: alkylene(s), >N—, —NHC(O)—, —C(O)NH— or fluoropolyether and Y is —NH₂.

34. The method of claim 3 wherein X is —C(O)N< or —C(O)NH—, L is a linking chain comprising one or more of the following, connected together but not in any particular order: alkylene(s), >N—, —O—, —OC(O)NH—, —NHC(O)—, —(O)CNH—, —NHC(O)NH—, polyether or fluoropolyether and Y is HO—, H₂N— or —OCOC(CH₃)═CH₂.

35. The method of claim 34 wherein L is a linking chain comprising one or more of the following, connected together but not in any particular order: alkylene(s), —OC(O)NH—, —NHC(O)NH— or polyether and Y is —NH₂.

36. The method of claim 34 wherein L is a linking chain comprising one or more of the following, connected together but not in any particular order: alkylene(s), >N—, —OC(O)NH— or —NHC(O)NH— and Y is —NH₂.

37. The method of claim 34 wherein L is a linking chain comprising one or more of the following, connected together but not in any particular order: alkylene(s) or —OC(O)NH— and Y is —OCOC(CH₃)═CH₂.

38. A process for the preparation of electrophoretic microparticles, which process comprises:
(a) preparing a precursor/internal phase comprising a polymer precursor;
(b) emulsifying the precursor/internal phase into a continuous phase comprising a fluorinated solvent or solvent mixture to form an emulsion; and
(c) forming electrophoretic microparticles by hardening the emulsion, in which a fluorinated quaternary nitrogen salt is present in the precursor/internal phase, the continuous phase or both the precursor/internal phase and the continuous phase.

39. The process of claim 38 further comprising dispersing a pigment, in the form of particles, into the precursor/internal phase.

40. The process of claim 38 wherein said fluorinated quaternary nitrogen salt is a fluorinated pyridinium, fluorinated quinolinium, fluorinated ammonium, fluorinated acridinium, fluorinated azolium salt or a fused ring derivative thereof.

41. The process of claim 38 wherein said fluorinated quaternary nitrogen salt is present in the amount of about 0.1% to about 20% by weight, based on the total weight of the electrophoretic microparticles.

42. The process of claim 38 wherein said fluorinated quaternary nitrogen salt is present in the amount of about 0.2% to about 10% by weight, based on the total weight of the electrophoretic microparticles.

43. The process of claim 38 further comprising adding a protective colloid in the continuous phase.

44. The process of claim 38 further comprising adding a second charge controlling agent soluble or dispersible in the continuous phase.

45. The process of claim 38 further comprising adding a second charge controlling agent in the precursor/internal phase.

46. The process of claim 38 further comprising adding a second monomer, chain extender or oligomer in the precursor/internal phase.

47. The process of claim 38 wherein step (b) is a direct or inverse emulsification process.

48. The process of claim 38 wherein said precursor/internal phase further comprises a fugitive diluent.

49. The process of claim 48 wherein said fugitive solvent is a solvent having a boiling point lower than 160° C.

50. The process of claim 49 wherein said fugitive solvent is selected from the group consisting of acetone, ether, methyl ethyl ketone, methyl propyl ketone, methyl butyl ketone, cyclohexanone, ethyl acetate, propyl acetate, methylene chloride, tetrahydrofuran, toluene and xylene.

51. An electrophoretic dispersion which comprises electrophoretic microparticles comprising a fluorinated pyridinium, fluorinated quinolinium, fluorinated ammonium, fluorinated acridinium, fluorinated azolium or a fused ring derivative thereof.

52. An electrophoretic display comprising:
   (a) a top layer and a bottom layer, at least one of which is transparent,
   (b) an array of cells sandwiched between the two layers and said cells are filled with an electrophoretic dispersion comprising electrophoretic microparticles which comprises a fluorinated pyridinium, fluorinated quinolinium, fluorinated ammonium, fluorinated acridinium, fluorinated azolium or a fused ring derivative thereof.

53. The electrophoretic display of claim 52 wherein said electrophoretic microparticles are pigment-containing microparticles.

54. The electrophoretic display of claim 52 wherein said cells are prepared by the microcup technology.

55. The electrophoretic display of claim 52 wherein said cells are prepared by the microprism or microgroove technology.

56. The electrophoretic display of claim 52 wherein said cells are prepared by the encapsulation technology.

57. The electrophoretic display of claim 52 which is driven by the traditional up/down switching mode, the in-plane switching mode, the total internal reflection switching mode or the dual switching mode.

58. The method of claim 1 wherein a pigment in the form of particles is predispersed in said precursor/internal phase.

59. The process of claim 38 wherein a pigment in the form of particles is predispersed in said precursor/internal phase.

60. The process according to claim 38, wherein said fluorinated quaternary nitrogen salt is selected from the group consisting of the following formulas:

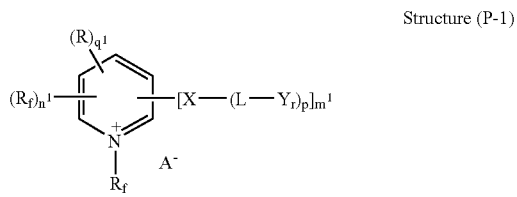

Structure (P-1)

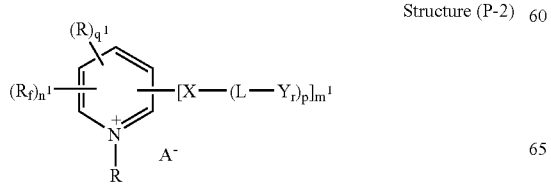

Structure (P-2)

-continued

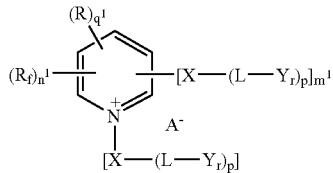

Structure (P-3)

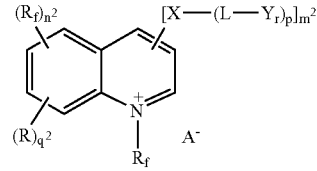

Structure (Q-1)

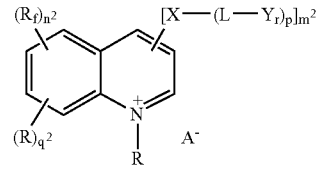

Structure (Q-2)

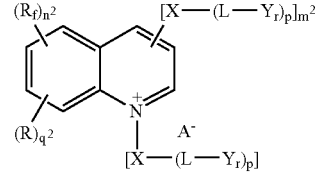

Structure (Q-3)

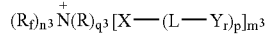

Structure (A-1)

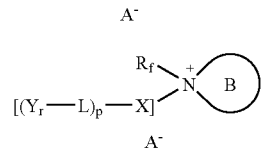

Structure (A-2)

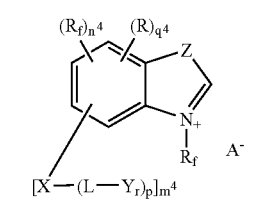

Structure (A-3)

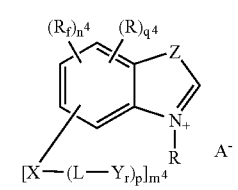

Structure (A-4)

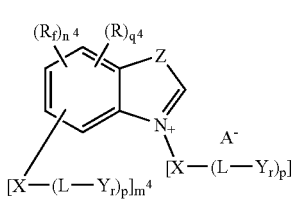

Structure (A-5)

-continued

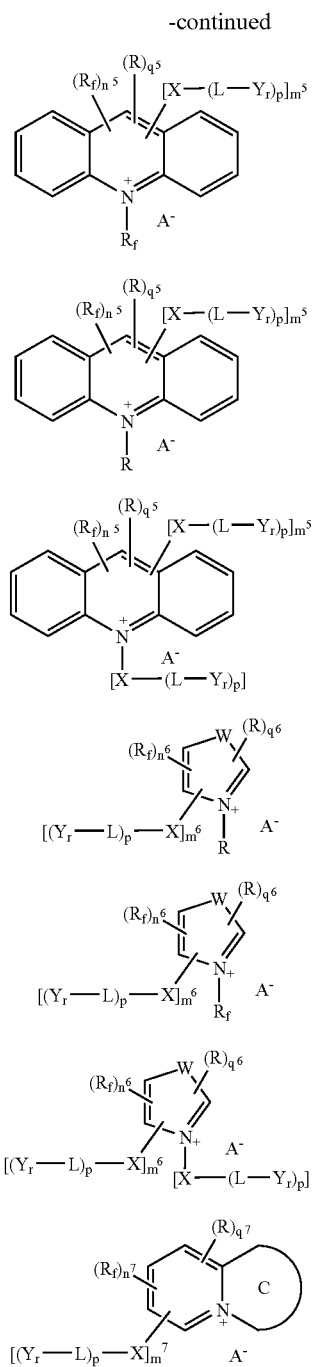

Structure (A-6)
Structure (A-7)
Structure (A-8)
Structure (A-9)
Structure (A-10)
Structure (A-11)
Structure (A-12)

wherein:
A is a counterion, R is chlorine, bromine, iodine, cyano, nitro, alkyl, substituted alkyl, heteroalkyl, substituted heteroalkyl, aryl, substituted aryl, heteroaryl, substituted heteroaryl, $R^1O$-, $R^1S$-, $R_1R^2N$-, $R^1CO$-, $R^1OCO$-, $R^1COO$-, $R^1CONR^2$-, $R^1R^2NCO$-, $R^1NHCONR^2$-, $R^1SO_2NR^2$-, $R^1R^2NSO_2$-, $R^1SO$-, or $R^1SO_2$-in which $R^1$ and $R^2$ are independently hydrogen, alkyl, substituted alkyl, heteroalkyl, substituted heteroalkyl, aryl, substituted aryl, heteroaryl or substituted heteroaryl; $R_f$ is fluorine, a fluorinated derivative of any one of alkyl, substituted alkyl, heteroalkyl, substituted heteroalkyl, aryl, substituted aryl, heteroaryl or substituted heteroaryl or a fluorinated oligomer or polymer; provided that $R_f$ is not fluorine when $R_f$ is bonded to nitrogen; W is -S- or is $NR^3$- in which $R^3$ is hydrogen, alkyl, substituted alkyl, heteroalkyl, substituted heteroalkyl, aryl, substituted aryl, heteroaryl or substituted heteroaryl; X is a linking group; L is absent or a di-, tri- or tetra-valent linking chain; Y is a reactive functional group; Z is -O- or -S-, or is $CR^4_2$-or-$NR^4$-in which each $R^4$ is independently hydrogen, alky, substituted alkyl, heteroalkyl, substituted heteroalkyl, aryl, substituted aryl, heteroaryl or substituted heteroaryl; r is 1-3; p is 1-5; $m^1$, $n^1$ and $q^1$ are independently integers from 0-5, and $m^1+n^1+q^1 \leq 5$; $m^2$, $n^2$, and $q^2$ are independently integers from 0-7 and $m^2+n^2+q^2 \leq 7$; $m^3$, $n^3$, and $q^3$ are independently integers from 0-4, and $m^3+n^3+q^3=4$; $m^4$, $n^4$, and $q^4$ are independently integers from 0-5, and $m^4+n^4+q^4 \leq 5$; $m^5$, $n^5$, and $q^5$ are independently integers from 0-9, and $m^5+n^5+q^5 \leq 9$; $m^6$, $n^6$, and $q^6$ are independently integers from 0-3, and $m^6+n^6+q^6 \leq 3$; $m^7$, $n^7$, and $q^7$ are independently integers from 0-6, and $m^7+n^7+q^7 \leq 6$; the ring B is a saturated or unsaturated monocyclic or fused bi- or tricyclic ring having 4-13 ring atoms, optionally comprising one or two ring heteroatoms selected from the group consisting of O, S and NR* wherein R* is hydrogen or an alkyl of 1-12 carbon atoms, such that structure A-2 is an optionally substituted pyrrolidinium, piperidinium or morpholinium salt provided that the ring B is not an aromatically unsaturated ring; and the ring C is an aromatic monocyclic or fused bi- or tricyclic ring having 4-12 ring atoms, optionally comprising 1-4 ring heteroatoms selected from the group consisting of O, S and NR* wherein R* is hydrogen or an alkyl of 1-12 carbon atoms, such that structure A-12 is an optionally substituted quinolizinylium salt, provided that the fluorinated quaternary nitrogen salt comprises at least 10% by weight of fluorine.

61. An electrophoretic dispersion which comprises electrophoretic microparticles comprising a fluorinated quaternary nitrogen salt selected from the group consisting of the following formulas:

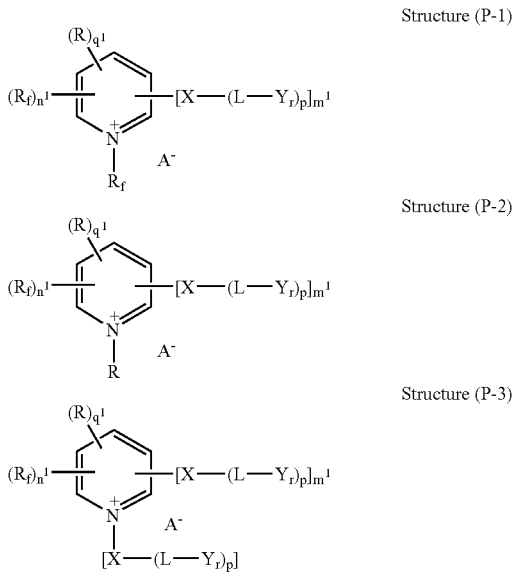

Structure (P-1)
Structure (P-2)
Structure (P-3)

-continued

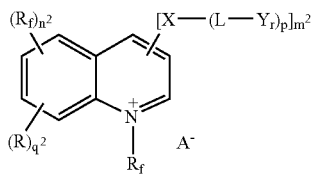

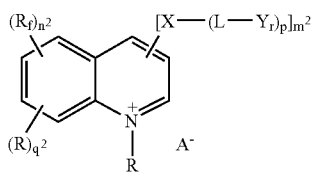

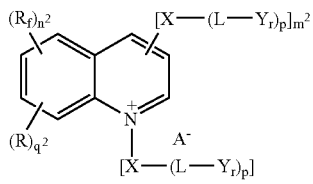

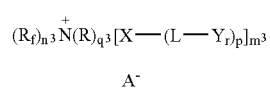

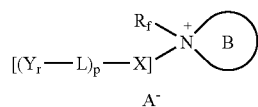

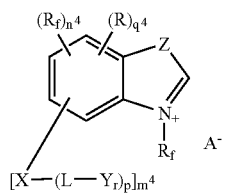

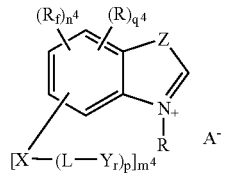

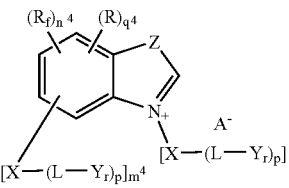

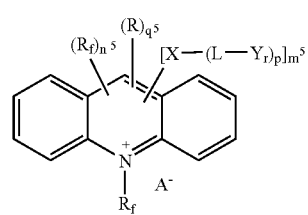

Structure (Q-1)

Structure (Q-2)

Structure (Q-3)

Structure (A-1)

Structure (A-2)

Structure (A-3)

Structure (A-4)

Structure (A-5)

Structure (A-6)

-continued

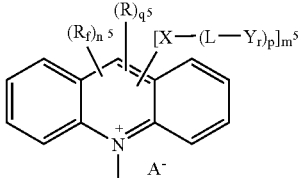

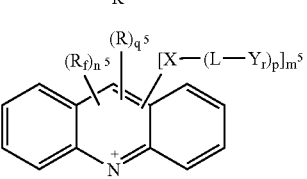

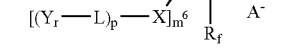

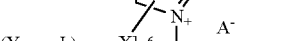

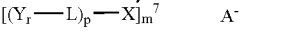

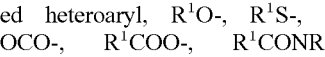

Structure (A-7)

Structure (A-8)

Structure (A-9)

Structure (A-10)

Structure (A-11)

Structure (A-12)

wherein:

A is a counterion, R is chlorine, bromine, iodine, cyano, nitro, alkyl, substituted alkyl, heteroalkyl, substituted heteroalkyl, aryl, substituted aryl, heteroaryl, substituted heteroaryl, $R^1O-$, $R^1S-$, $R^1R^2N-$, $R^1CO-$, $R^1OCO-$, $R^1COO-$, $R^1CONR^2-$, $R^1R^2NCO-$, $R^1NHCONR^2-$, $R^1SO_2NR^2-$, $R^1R^2NSO_2-$, $R^1SO-$, or $R^1SO_2-$ in which $R^1$ and $R^2$ are independently hydrogen, alkyl, substituted alkyl, heteroalkyl, substituted heteroalkyl, aryl, substituted aryl, heteroaryl or substituted heteroaryl; $R_f$ is fluorine, a fluorinated derivative of any one of alkyl, substituted alkyl, heteroalkyl, substituted heteroalkyl, aryl, substituted aryl, heteroaryl or substituted heteroaryl or a fluorinated oligomer or polymer; provided that $R_f$ is not fluorine when $R_f$ is bonded to nitrogen; W is -S- or is-$NR^3$- in which $R^3$ is hydrogen, alkyl, substituted alkyl, heteroalkyl, substituted heteroalkyl, aryl, substituted aryl, heteroaryl or substituted heteroaryl; X is a linking group; L is absent or a di-, tri- or tetra-valent linking chain; Y is a reactive functional group; Z is -O- or -S-, or is CR$^4_2$-or-NR$^4$-in which each R$^4$ is independently hydrogen, alkyl, substituted alkyl, heteroalkyl, substituted heteroalkyl, aryl, substituted aryl, heteroaryl or substituted heteroaryl; r is 1-3; p is 1-5; m$^1$, n$^1$ and q$^1$ are independently integers from 0-5, and m$^1$+n$^1$+q$^1$≦5; m$^2$, n$^2$, and q$^2$ are independently integers from 0-7 and m$^2$+n$^2$+q$^2$≦7; m$^3$, n$^3$, and q$^3$ are independently integers from 0-4, and m$^3$+n$^3$+q$^3$=4; m$^4$, n$^4$, and q$^4$ are independently integers from 0-5, and m$^4$+n$^4$+q$^4$≦5; m$^5$, n$^5$, and q$^5$ are independently integers from 0-9, and m$^5$+n$^5$+q$^5$≦9; m$^6$, n$^6$, and q$^6$ are independently integers from 0-3, and m$^6$+n$^6$+q$^6$≦3; m$^7$, n$^7$, and q$^7$ are independently integers from 0-6, and m$^7$+n$^7$+q$^7$≦6; the ring B is a saturated or unsaturated inonocyclic or fused bi- or tricyclic ring having 4- 13 ring atoms, optionally comprising one or two ring heteroatoms selected from the group consisting of O, S and NR* wherein R* is hydrogen or an alkyl of 1-12 carbon atoms, such that structure A-2 is an optionally substituted pyrrolidinium, piperidinium or morpholinium salt provided that the ring B is not an aromatically unsaturated ring; and the ring C is an aromatic inonocyclic or fused bi- or tricyclic ring having 4-12 ring atoms, optionally comprising 1-4 ring heteroatoms selected from the group consisting of O, S and NR* wherein R* is hydrogen or an alkyl of 1-12 carbon atoms, such that structure A-12 is an optionally substituted quinolizinylium salt, provided that the fluorinated quaternary nitrogen salt comprises at least 10% by weight of fluorine.

62. An electrophoretic display comprising:

(a) a top layer and a bottom layer, at least one of which is transparent, (b) an array of cells sandwiched between the two layers and said cells are filled with an electrophoretic dispersion comprising electrophoretic particles which comprises a fluorinated quaternary nitrogen salt selected from the group consisting of the following formulas:

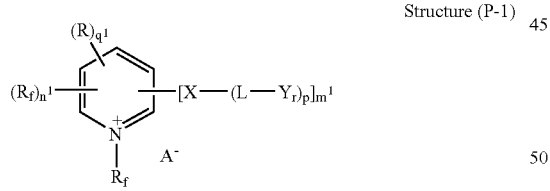

Structure (P-1)

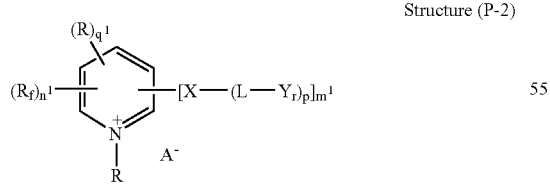

Structure (P-2)

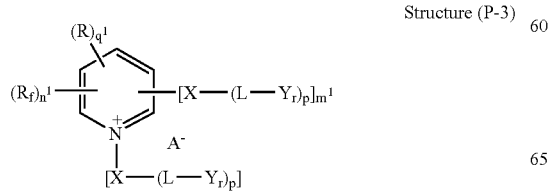

Structure (P-3)

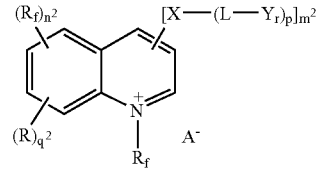

Structure (Q-1)

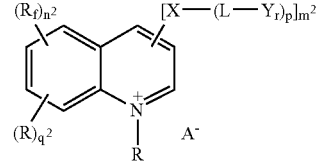

Structure (Q-2)

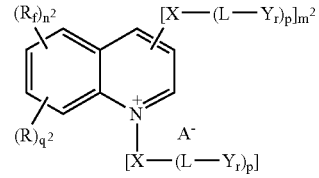

Structure (Q-3)

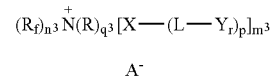

Structure (A-1)

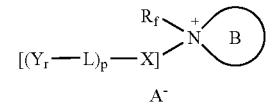

Structure (A-2)

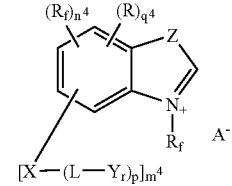

Structure (A-3)

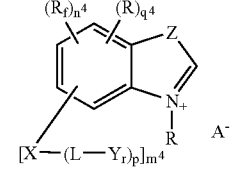

Structure (A-4)

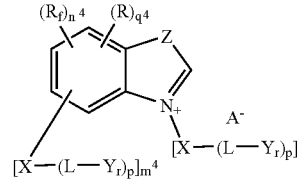

Structure (A-5)

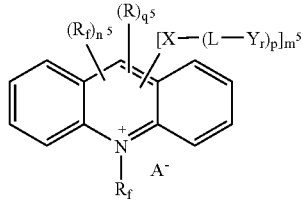

Structure (A-6)

-continued

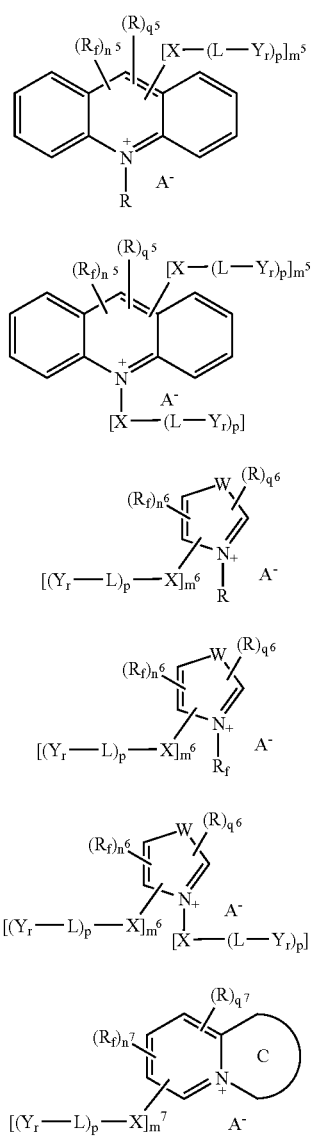

Structure (A-7)

Structure (A-8)

Structure (A-9)

Structure (A-10)

Structure (A-11)

Structure (A-12)

wherein:
A is a counterion, R is chlorine, bromine, iodine, cyano, nitro, alkyl, substituted alkyl, heteroalkyl, substituted heteroalkyl, aryl, substituted aryl, heteroaryl, substituted heteroaryl, $R^1$)-, $R^1S$-, $R^1R^2N$-, $R^1CO$-, $R^1OCO$-, $R^1COO$-, $R^1CONR^2$-, $R^1R^2NCO$-, $R^1NHCONR^2$-, $R^1SO_2NR^2$-, $R^1R^2NSO_2$-, $R^1SO$-, or $R^1SO_2$- in which $R^1$ and $R^2$ are independently hydrogen, alkyl, substituted alkyl, heteroalkyl, substituted heteroalkyl, aryl, substituted aryl, heteroaryl or substituted heteroaryl; $R_f$ is fluorine, a fluorinated derivative of any one of alkyl, substituted alkyl, heteroalkyl, substituted heteroalkyl, aryl, substituted aryl, heteroaryl or substituted heteroaryl or a fluorinated oligomer or polymer; provided that $R_f$ is not fluorine when $R_f$ is bonded to nitrogen; W is -S- or is $NR^3$- in which $R^3$ is hydrogen, alkyl, substituted alkyl, heteroalkyl, substituted heteroalkyl, aryl, substituted aryl, heteroaryl or substituted heteroaryl; X is a linking group; L is absent or a di-, tri- or tetra-valent linking chain; Y is a reactive functional group; Z is -O- or -S-, or is $CR^4_2$- or $NR^4$- in which each $R^4$ is independently hydrogen, alkyl, substituted alkyl, heteroalkyl, substituted heteroalkyl, aryl, substituted aryl, heteroaryl or substituted heteroaryl; r is 1-3; p is 1-5; $m^1$, $n^1$ are independently integers from 0-5, and $m^1+n^1+q^1 \leq 5$; $m^2$, $n^2$, and $q^2$ are independently integers from 0-7 and $m^2+n^2+q^2 \leq 7$; $m^3$, $n^3$, and $q^3$ are independently integers from 0-4, and $m^3+n^3+q^3=4$; $m^4$, $n^4$, and $q^4$ are independently integers from 0-5, and $m^4+n^4+q^4 \leq 5$; $m^5$, $n^5$, and $q^5$ are independently integers from 0-9, and $m^5+n^5+q^5 \leq 9$; $m^6$, $n^6$, and $q^6$ are independently integers from 0-3, and $m^6+n^6+q^6 \leq 3$; $m^7$, $n^7$, and $q^7$ are independently integers from 0-6, and $m^7+n^7+q^7 \leq 6$; the ring B is a saturated or unsaturated monocyclic or fused bi- or tricyclic ring having 4-13 ring atoms, optionally comprising one or two ring heteroatoms selected from the group consisting of O, S and NR* wherein R* is hydrogen or an alkyl of 1-12 carbon atoms, such that structure A-2 is an optionally substituted pyrrolidinium, piperidinium or morpholinium salt provided that the ring B is not an aromatically unsaturated ring; and the ring C is an aromatic monocyclic or fused bi- or tricyclic ring having 4-12 ring atoms, optionally comprising 1-4 ring heteroatoms selected from the group consisting of O, S and NR* wherein R* is hydrogen or an alkyl of 1-12 carbon atoms, such that structure A-12 is an optionally substituted quinolizinylium salt, provided that the fluorinated quaternary nitrogen salt comprises at least 10% by weight of fluorine.

* * * * *